(12) United States Patent
Uneyama et al.

(10) Patent No.: US 7,051,194 B2
(45) Date of Patent: May 23, 2006

(54) SELF-SYNCHRONOUS TRANSFER CONTROL CIRCUIT AND DATA DRIVEN INFORMATION PROCESSING DEVICE USING THE SAME

(75) Inventors: Takuji Uneyama, Yamotokoriyama (JP); Motoki Takase, Yamatokoriyama (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 818 days.

(21) Appl. No.: 09/813,090

(22) Filed: Mar. 21, 2001

(65) Prior Publication Data

US 2001/0028629 A1    Oct. 11, 2001

(30) Foreign Application Priority Data

Mar. 31, 2000  (JP) .............................. 2000-098016

(51) Int. Cl.
*G06F 9/52* (2006.01)
*G06F 1/12* (2006.01)
*G06F 13/42* (2006.01)

(52) U.S. Cl. .................... 712/225; 713/501; 710/33

(58) Field of Classification Search ................ 712/225, 712/29, 25, 201, 27; 710/29, 30, 31, 32, 710/33, 34, 35, 112, 25, 61; 709/231, 236, 709/238, 245; 713/502, 601, 501; 370/392, 370/416

See application file for complete search history.

(56) References Cited

U.S. PATENT DOCUMENTS

| | | | |
|---|---|---|---|
| 4,214,206 A * | 7/1980 | Everaarts | 375/214 |
| 4,692,917 A * | 9/1987 | Fujioka | 370/392 |
| 5,140,582 A * | 8/1992 | Tsuboi et al. | 370/416 |
| 5,267,235 A * | 11/1993 | Thacker | 370/396 |
| 5,539,916 A * | 7/1996 | Yamasaki et al. | 710/22 |
| 5,577,256 A | 11/1996 | Muramatsu et al. | |
| 5,590,355 A | 12/1996 | Shichiku et al. | |
| 5,630,151 A | 5/1997 | Muramatsu et al. | |
| 5,640,525 A | 6/1997 | Yumoto et al. | |
| 5,652,906 A | 7/1997 | Kadosumi et al. | |
| 5,748,933 A | 5/1998 | Amagai et al. | |
| 5,761,737 A | 6/1998 | Kadosumi et al. | |
| 5,794,064 A | 8/1998 | Yoshida et al. | |
| 5,794,065 A | 8/1998 | Hatakeyama et al. | |
| 5,802,399 A | 9/1998 | Yumoto et al. | |
| 5,812,806 A | 9/1998 | Muramatsu et al. | |
| 5,826,098 A | 10/1998 | Kanekura et al. | |
| 5,848,290 A | 12/1998 | Yoshida et al. | |
| 5,870,620 A | 2/1999 | Kadosumi et al. | |
| 5,872,991 A | 2/1999 | Okamoto et al. | |
| 5,913,055 A | 6/1999 | Yoshida et al. | |
| 5,918,063 A | 6/1999 | Miyama et al. | |
| 5,956,517 A | 9/1999 | Okamoto et al. | |

FOREIGN PATENT DOCUMENTS

| | | |
|---|---|---|
| JP | 6-83731 | 3/1994 |
| JP | 08-329036 A | 12/1996 |
| JP | 11-272645 A | 10/1999 |

* cited by examiner

*Primary Examiner*—Daniel H. Pan
(74) *Attorney, Agent, or Firm*—Birch, Stewart, Kolasch & Birch, LLP

(57) ABSTRACT

When an instruction decoder decodes an instruction code included in packet data, a copy flag and copy number information are provided to a self-synchronous transfer control circuit. In the self-synchronous transfer control circuit, when a data transfer enabling signal is applied from a C element in a subsequent stage, a node number manipulation circuit manipulates a node number to make copies such that packets can be distinguished from each other, and then data is transferred from a pipeline register to a pipeline register in a subsequent stage.

8 Claims, 17 Drawing Sheets

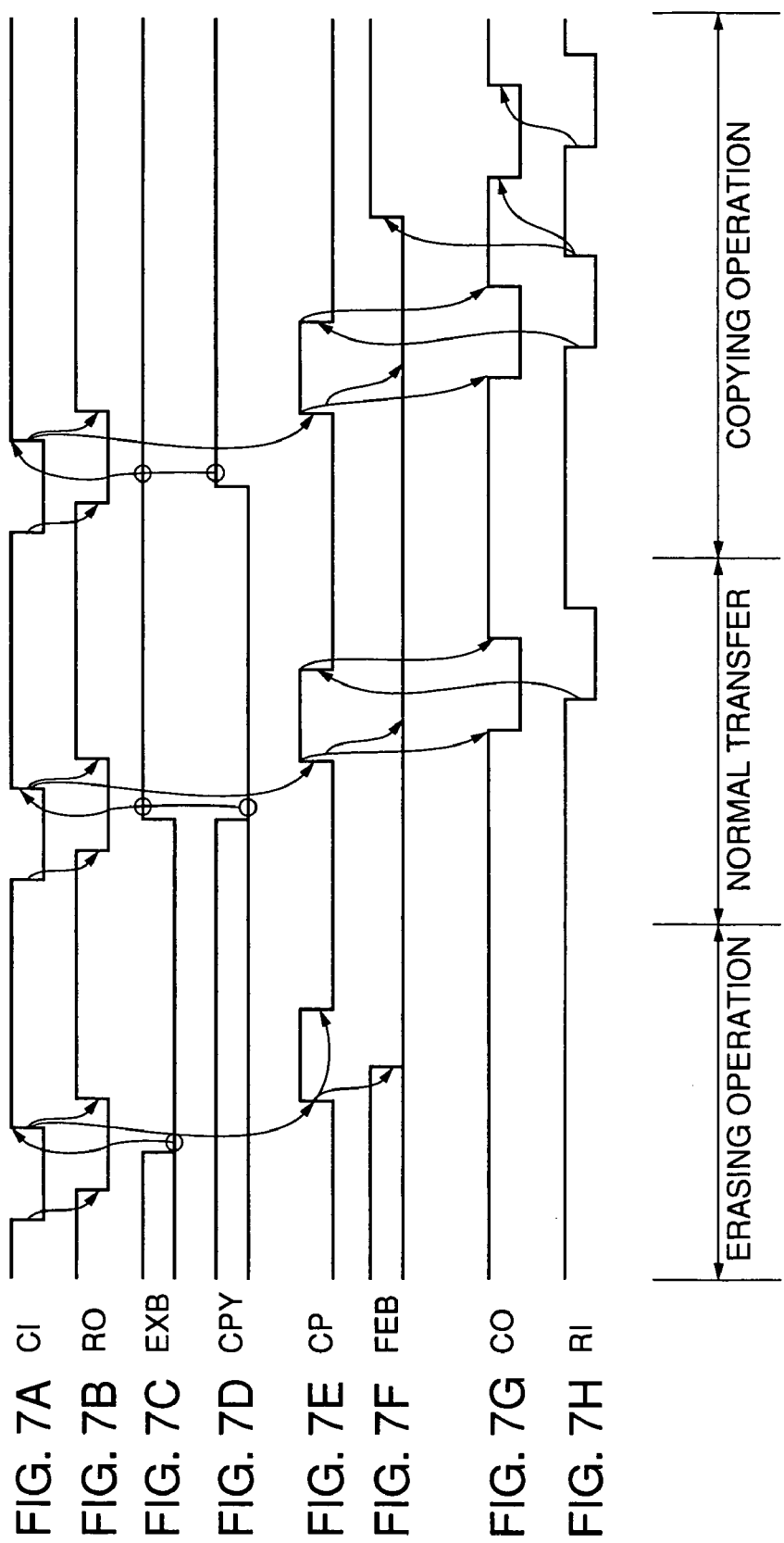

F1: DESTINATION NODE NUMBER AREA
F2: GENERATION NUMBER AREA
F3: INSTRUCTION CODE AREA
F4: DATA REGION

FIG. 13    PRIOR ART
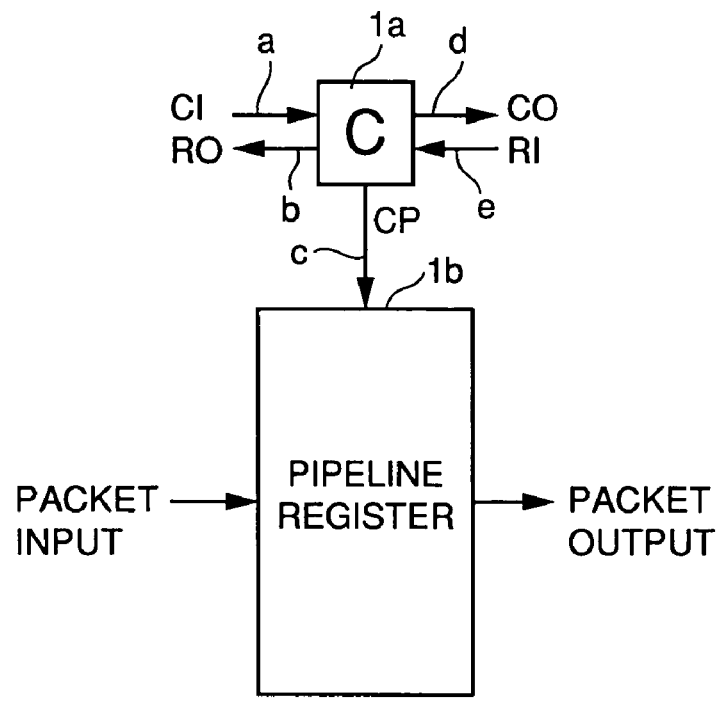
FIG. 14A    PRIOR ART    CI 
FIG. 14B    PRIOR ART    RO 
FIG. 14C    PRIOR ART    CP 
FIG. 14D    PRIOR ART    CO 
FIG. 14E    PRIOR ART    RI 

SELF-SYNCHRONOUS TRANSFER CONTROL CIRCUIT AND DATA DRIVEN INFORMATION PROCESSING DEVICE USING THE SAME

BACKGROUND OF THE INVENTION

1. Field of the Invention

The present invention relates to a self-synchronous transfer control circuit and a data driven information processing device using the same, and more particularly, to a data driven information processing device in which a self-synchronous transfer control circuit enabling transfer of a plurality of pulses from one pulse is used for multi-output instructions, to enhance program performance.

2. Description of the Background Art

As the use of multimedia has been increased in recent years, a large amount of operations are required in image processing and so forth. The data driven information processing device (hereinafter referred to as a data driven processor) has been proposed as a device for rapidly processing such a large amount of operations. In the data driven processor, a process is carried out according to a rule in that the process is performed when there are all the input data required for a process and a resource required for the process such as an operation device is allocated. A data transmission device employing an asynchronous handshake system is used for a data processing device including information processing operation of the data driven type. In such a data transmission device, a plurality of data transmission paths are connected with each other, which mutually transmit/receive data transfer request signals (hereinafter referred to as SEND signal) and transfer enabling signals indicating whether or not the data transfer is permitted (hereinafter referred to as ACK signal), to autonomously transfer data.

FIG. 12 shows a format of a data packet to which a conventional art and the present invention are applied. In FIG. 12, the data packet includes a destination node number area F1 for storing a destination node number ND#, a generation number area F2 for storing a generation number GN#, an instruction code area F3 for storing an instruction code OPC and a data area F4 for storing data DATA. The generation number herein represents a number for distinguishing data groups to be subjected to parallel processing from each other. The destination node number represents a number for distinguishing input data within one generation from each other. The instruction code is for executing instructions stored in an instruction decoder.

FIG. 13 is a block diagram showing a configuration of a data transmission path. The data transmission path includes a self-synchronous transfer control circuit (hereinafter referred to as a C element) 1a and a data holding circuit (hereinafter referred to as a pipeline register) 1b constituted by a D type flip-flop. C element 1a includes a pulse input terminal CI receiving a pulse, a transfer enabling output terminal RO outputting a transfer enabling signal indicating enabling or disabling of the transfer, a pulse output terminal CO outputting a pulse, a transfer enabling input terminal RI receiving the transfer enabling signal indicating enabling or disabling of transfer, and a pulse output terminal CP for applying a clock pulse controlling the data holding operation of pipeline register 1b.

FIGS. 14A to 14E are timing charts illustrating the operation of C element shown in FIG. 13. When C element 1a receives a pulse indicated in FIG. 14A from terminal CI, if the transfer enabling signal input at terminal RI shown in FIG. 14E is enabled, C element outputs a pulse indicated in FIG. 14D from terminal CO and also outputs a pulse shown in FIG. 14C to pipeline register 1b. In response to the pulse applied from C element 1a, pipeline register 1b holds the applied input packet data, and then outputs the held data as output packet data.

FIG. 15 is a block diagram showing an example where the data transmission paths shown in FIG. 13 are connected in sequence via predetermined logic circuits. The input packet data is processed sequentially in logic circuits 3d and 3e while sequentially being transferred along pipeline registers 3a→3b→3c. In FIG. 15, for example, when pipeline register 3a is in a data holding state while pipeline register 3b in the subsequent stage is also in the data holding state, no data is transmitted from pipeline register 3a to pipeline register 3b.

Further, if pipeline register 3b in the subsequent stage is in non-data holding state or has come to be in the non-data holding state, data is transmitted from pipeline register 3a to logic circuit 3d, where the data is processed, and to pipeline register 3b, taking at least a preset delay time. A control which is called a self-synchronous transfer control asynchronously transmits data with at least preset delay time, in response to SEND signals input to/output from terminals CI and CO and ACK signals input to/output from terminals RI and RO, which are transmitted between adjacent pipeline registers connected as described above. A circuit controlling such data transfer is called a self-synchronous transfer control circuit.

FIG. 16 is a detailed circuit diagram of the C element shown in FIG. 15. The C element may be, for example, the one described in Japanese Patent Laying-Open No. 6-83731. In FIG. 16, pulse input terminal CI receives a pulsed SEND signal (a transfer request signal) from a preceding stage, and transfer enabling output terminal RO outputs an ACK signal (a transfer enabling signal) to the preceding stage. Pulse output terminal CO outputs a pulsed SEND signal to a subsequent stage, and transfer enabling input terminal RI receives an ACK signal from the subsequent stage.

A master reset input terminal MR receives a master reset signal. When a pulse at a logic high or "H" level is applied to master reset input terminal MR, the pulse is inverted at an inverter 4e, and the inverted pulse resets flip-flops 4a and 4b to initialize C element. Then, an "H" level signal is output, as an initial state, from both pulse output terminal CO and transfer enabling output terminal RO. The "H" level output from transfer enabling output terminal RO indicates a transfer enabling state, whereas a logic low or an "L" level output therefrom indicates a transfer disabling state. Further, the "H" level output from pulse output terminal CO indicates the state where no data transfer is required for the subsequent stage, whereas the "L" level therefrom indicates a state where the data transfer is required for or the data is being transferred to the subsequent stage.

When the signal of "L" level is input to pulse input terminal CI, i.e., when data transfer is required from the preceding stage, flip-flop 4a is set and outputs an "H" level signal to an output Q. The "H" level signal is inverted at an inverter 4d, and thus an "L" level signal is output from transfer enabling output terminal RO, which inhibits further data transfer. After a certain period of time, an "H" level signal is input to pulse input terminal CI, terminating data setting from the preceding stage to the C element. In such a state, when the circuit is in a state where an "H" level signal is input from transfer enabling input terminal RI, i.e. where the data transfer from the subsequent stage is permitted, and also in a state where pulse output terminal CO is outputting no "H" level signal, i.e., is transferring no data to the subsequent stage (the state where no data transfer is required for the subsequent stage), an NAND gate 4c is activated, outputting an "L" level signal.

As a result, flip-flops 4a and 4b are both reset, and flip-flop 4b outputs an "H" level signal, via a delay element 4e, from pulse output terminal CP to the pipeline register, together with a SEND signal of the "L" level, via a delay element 4f, from pulse output terminal CO to the C element in the subsequent stage. That is, the data transfer for the subsequent stage is required. The C element in the subsequent stage which has received the SEND signal of the "L" level outputs an ACK signal made to be at "L" level from terminal RO, indicating transfer inhibition, such that no further data is transferred to the C element. The C element inputs the "L" level ACK signal from transfer enabling input terminal RI, setting flip-flop 4b. As a result, the "L" level signal is output, via delay element 4e, from pulse output terminal CP to the pipeline register, and also the "H" level SEND signal is output, via delay element 4f, from pulse output transmit CO to the subsequent stage, terminating the data transfer.

FIG. 17 is a schematic block diagram of a conventional data driven processor configured including the data transfer device shown in FIG. 15. In FIG. 17, a data driven processor Pe includes a junction unit JNC, a firing control unit FC, an operation unit FP, a program storage unit PS, a branch unit BRN, a plurality of pipeline registers 3a to 3c, and a plurality of C elements 2a to 2c. Each of C elements 2a to 2c controls packet transfer for a corresponding processing unit (FC, FP or PS) by exchanging packet transfer pulses (signals at CI, CO, RI and RO) to C elements in preceding and subsequent stages. In response to pulse inputs from the corresponding C elements 2a to 2c, pipeline registers 3a to 3c each takes in the data input from the preceding processing unit and holds the data, and delivers it to the output stage, where the data is held until the next pulse is input.

In FIG. 17, when the data packet shown in FIG. 12 is input to processor Pe, the input packet first passes through junction unit JNC, is transferred to firing control unit FC, and a pair data is formed from identical packets based on a destination node number ND# and a generation number GN#. That is, two different data packets having identical node number ND# and generation number GN# are detected, and the data in one of the data packets is additionally stored in data area F4 (FIG. 12) of the other data packet, outputting the other data packet. The packet of which the pair data (a set of data) is stored in data area F4 is subsequently transmitted to operation unit FP. Operation unit FP inputs the transmitted data packet, executes a predetermined operation for the content of the input packet based on instruction code OPC of the input packet, and stores the operation result in data area F4 of the input packet. The input packet is subsequently transmitted to program storage unit PS.

Program storage unit PS inputs the transmitted data packet, and reads node information (node number ND#) to which the packet should go next from the program memory in program storage unit PS, instruction information (instruction code OPC) to be subsequently executed, and a copy flag CPY. The read destination node number ND# and instruction code OPC are then stored respectively in destination node number area F1 and instruction code area F3 of the input packet. Further, if the read copy flag CPY is "I", the subsequent address in the program memory is determined also to be valid, and thus the packet storing destination node number ND# and instruction code OPC stored in the next address will also be generated.

The packet output from program storage unit PS is transmitted to branch unit BRN, and is output based on its destination node number ND#, or is returned again into the processor. To make three copies of identical data, the packet returned to the processor will be used for the copying process. Thus, to make a plurality copies of the identical data, the packet must be returned to the processor a plurality of times for the copying process.

FIG. 4A is a data flow diagram showing an example where four copies of the input data are made. An NOP (copying without operation) instruction 16a is executed for the input data to output data 16h and 16i. Data 16i is executed as an OPC1 instruction 16d corresponding to instruction code OPC of the packet shown in FIG. 12, and data 16h is executed as an NOP instruction 16b. In NOP instruction 16b, copying is executed to output data 16j and 16k. Data 16k is executed as an OPC2 instruction 16e, and data 16j is executed as an NOP instruction 16c. In NOP instruction 16c, copying is executed to output data 16l and 16m. Data 16m is executed as an OPC3 instruction 16f, and data 16l is executed as an OPC4 instruction 16g. Thus, to make four copies of data, two packet-copying instructions must be executed three times.

FIG. 18 is a diagram showing an example where a conventional data driven processor is used to execute a multiplication instruction. In FIG. 18, a multiplier 3f and a shifter 3g are provided as logic circuits 3d and 3e shown in FIG. 15 described earlier. For example, 12-bit data is multiplied with another 12-bit data, the operation result will be 24-bit data. However, the data to be stored in the data field as a packet format is limited to 12 bits as shown in FIG. 12, and therefore the resulted data of 24 bits must be divided into higher 12 bits and lower 12 bits for operation. Thus, shifter 3g has been used to execute two instructions, such as an instruction outputting a packet including the higher 12-bit data and an instruction outputting a packet including the lower 12-bit data, to realize the operation. As described above, when a process is to be executed such that a plurality of copies of packets are made or a plurality of identical data are required in the conventional data driven processor, it can be realized by executing the NOP instruction a plurality times, which however generates a useless go-around packet for executing the NOP instruction, i.e. a go-around packet returned from the packet output to the packet input as shown in FIG. 17. This has made it difficult to enhance the performance of the program execution.

SUMMARY OF THE INVENTION

A main object of the present invention is, therefore, to provide a self-synchronous transfer control circuit for enabling efficient execution of a program, and a data driven information processing device using the same.

According to one aspect of the present invention, a self-synchronous transfer control circuit includes: a transfer control circuit transferring a first pulse applied from a preceding stage to a subsequent stage as a second pule based on an instruction signal instructing enabling or disabling of transfer; and a pulse control circuit receiving one data transfer request pulse signal as the first pulse from the transfer control circuit in the preceding stage to output a plurality of data transfer request pulse signals as the second pulse to the transfer control circuit in the subsequent stage.

Thus, according to the present invention, it is possible to receive one data transfer request pulse signal from the transfer control circuit in the preceding stage to output a plurality of data request pulse signals to the transfer control circuit in the subsequent stage, enabling several-fold efficient data transfer control compared to a conventional example.

Preferably, a data number setting circuit is further provided, which can set the number of data transferred to the transfer control circuit in the subsequent stage.

Preferably, the pulse control circuit includes: a first logic circuit outputting a transfer enabling pulse signal to the transfer control circuit in the preceding stage as a third pulse, in response to application of the data transfer request pulse signal from the transfer control circuit in the preceding stage; a second logic circuit outputting data transfer request pulse signal to the transfer control circuit in the subsequent stage; a storage circuit storing the number of data in response to setting of the number of data by the data number setting circuit; a gate circuit receiving a transfer enabling signal as a fourth pulse from the transfer control circuit in the subsequent stage; and a transfer circuit outputting the transfer request pulse signal from the second logic circuit by the number of data stored in the storage circuit every time the gate circuit receives the transfer enabling signal, in response to application of the data transfer request pulse signal to the first logic circuit, when the number of data is stored in the storage circuit.

More preferably, the pulse control circuit includes: a counter circuit counting the number of times the transfer request pulse signal is output; and a disabling circuit comparing the counter output of the counter circuit with the number of data stored in the storage circuit to disable the output of the transfer request pulse signal by the transfer circuit, in response to correspondence thereof.

According to another aspect of the present invention, a data driven information processing device, using a self-synchronous transfer control circuit receiving one data transfer request pulse signal indicating request of transfer from a transfer control circuit in a preceding stage to output a plurality of transfer request pulse signals to a transfer control circuit in a subsequent stage, includes: a data transmission path holding a data packet based on a clock signal applied from the self-synchronous transfer control circuit; and a data number detection circuit for detecting the number of data based on output packet information set to the data packet held in the data transmission path, the self-synchronous transfer control circuit outputting a transfer request pulse signal corresponding to the number of data, in response to detection of the number of data by the data number detection circuit.

Preferably, the data transmission path holds a data packet including a destination field storing at least destination information, an instruction field storing instruction information and a data field storing data, and the data number detection circuit transmits, in response to detection that a copying instruction is present in an instruction field included in the data packet held in the data transmission path, data copied from the data transmission path to a data transmission path in a subsequent stage.

More preferably, the data number detection circuit transmits a plurality of data packets having the same data as the data in a data field included in the data packet and having destination information different from each other, from the data transmission path to a data transmission path in a subsequent stage, in response to detection of the copying instruction.

More preferably, the data number detection circuit transmits a plurality of data packets different from data in the data packet from the data transmission path to a data transmission path in a subsequent stage, in response to detection of the copying instruction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A to 7H are timing charts illustrating the operation of the self-synchronous transfer control circuit shown in FIG. 6;

FIG. 13 shows a data transmission path in a conventional data driven processor;

FIGS. 14A to 14E are timing charts showing the operation of the C element shown in FIG. 13;

DESCRIPTION OF THE PREFERRED EMBODIMENTS

Figure 1:
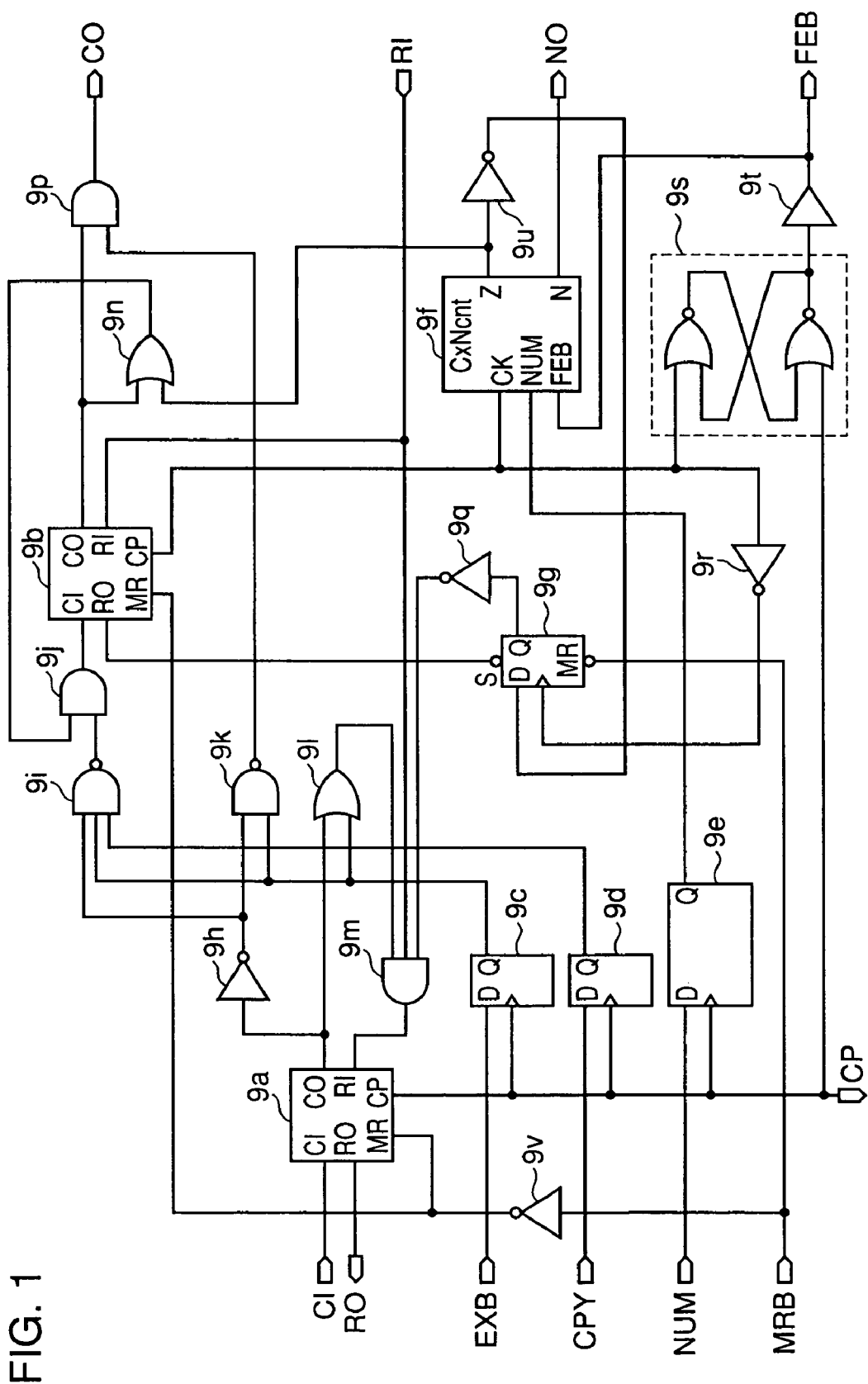
FIG. 1 is a circuit diagram showing a self-synchronous transfer control circuit used in a data driven processor according to the first embodiment of the present invention.

FIG. 1 is a circuit diagram showing a self-synchronous transfer control circuit in the first embodiment of the present invention. In FIG. 1, a pulse input terminal CI receives a pulsed transfer request signal from a preceding stage, and a transfer enabling output terminal RO outputs a transfer enabling signal to the preceding stage. A pulse output terminal CO outputs a pulsed transfer request signal to a subsequent stage, and a transfer enabling input terminal RI receives a transfer enabling signal from the subsequent stage. A master reset input terminal MRB receives a master reset signal, and a terminal EXB receives a packet erasing signal. A terminal CPY receives a packet copying signal, and an terminal NUM receives a packet copying number signal.

Further, the self-synchronous transfer control circuit includes C elements $9a$ and $9b$, D type flip-flops $9c$, $9d$, $9e$ and $9g$, NAND gates $9k$ and $9i$, OR gates $9l$ and $9n$, AND gates $9p$, $9j$ and $9m$, a counter $9f$, inverters $9h$, $9q$, $9r$, $9u$ and $9v$, a flip-flop $9s$, and a delay element $9t$.

FIGS. 2A to 2J are timing charts illustrating the operation of the self-synchronous transfer control circuit shown in FIG. 1.

Subsequently, referring to the timing charts in FIGS. 2A to 2J, a packet erasing operation, a packet normal transfer operation and a packet copying operation of the self-synchronous transfer control circuit in FIG. 1 are sequentially described.

First, when a pulse of "L" level is input from master reset terminal MRB, C elements $9a$ and $9b$ are reset, and "H" level signals are output both from the respective pulse output terminal CO and transfer enabling output terminal RO. The timing charts shown in FIGS. 2A to 2J begin from this state. As a result, as shown in FIGS. 2I and 2B, the "H" level signals are output both from pulse output terminal CO and transfer enabling output terminal RO of the self-synchronous transfer control circuit, initializing the self-synchronous transfer control circuit.

Further, D type flip-flop $9g$ is asynchronously reset, outputting an "L" level signal at its output Q. The signal is inverted to an "H" level signal at inverter $9q$, and is input to a three-input AND gate $9m$. In the operation of C elements $9a$ and $9b$, parts overlapping with those described in the conventional art will not be repeated.

When the "L" level signal indicated in FIG. 2C is input to terminal EXB, the self-synchronous transfer control circuit executes the packet erasing operation. That is, when a pulse signal of the "L" level shown in FIG. 2A is input from pulse input terminal CI of the self-synchronous transfer control circuit in a state where the "L" level signal has been input to terminal EXB, the pulse signal of the "L" level is input to pulse input terminal CI of C element $9a$.

As for terminal RI, to which master reset signal MRB has already been input, the "H" level signal indicated in FIG. 2J is input thereto, and C element $9a$ operates as conventional. When terminal CI is raised to the "H" level as shown in FIG. 2A after a certain time period, the "L" level signal indicated in FIG. 2I is output from pulse output terminal CO of C element $9a$, changing the level of the signal at pulse output terminal CP for a pipeline register to "H" level. The "H" level signal output from terminal CP of C element $9a$ sets flip-flop $9s$, which outputs the "L" level signal indicated in FIG. 2H to terminal FEB via delay element $9t$.

Moreover, in synchronization with the rise of the signal at the terminal CP, D type flip-flop $9c$ takes in the "L" level signal which has been input from terminal EXB, and takes out the signal from output Q thereof. This allows NAND gate $9k$ to output an "H" level signal. Terminal CO of C element $9b$ also outputs an "H" level signal in a similar manner, and hence pulse output terminal CO of the self-synchronous transfer control circuit keeps outputting the "H" level signal via AND gate $9p$. Further, output Q of D type flip-flop $9c$ is input to one input terminal of OR gate $9l$ as an "L" level signal, so that the signal output from pulse output terminal CO of C element $9a$ will directly be an output of OR gate $9l$.

Furthermore, an "H" level signal is applied to transfer enabling input terminal RI of the self-synchronous transfer control circuit as an initial state, so that the output signal of OR gate $9l$ input to AND gate $9m$ will directly be an output signal of AND gate $9m$. As a result, the signal output from pulse output terminal CO of C element $9a$ will be input to transfer enabling input terminal RI of C element $9a$ as it is.

As described above, the "L" level signal is output from pulse output terminal CO of C element $9a$, and thus the "L" level signal is input to transfer enabling input terminal RI of C element $9a$. This changes terminal CP of C element $9a$ to the "L" level as indicated also in the timing charts of FIG. 14 referenced in the conventional example. As a result, terminal CO of C element $9a$ is changed to the "H" level, the signal therefrom being input to terminal RI of C element $9a$ via OR gate $9l$ and AND gate $9m$, which generates a state where subsequent data transfer is permitted, terminating the packet erasing operation.

Figure 2:
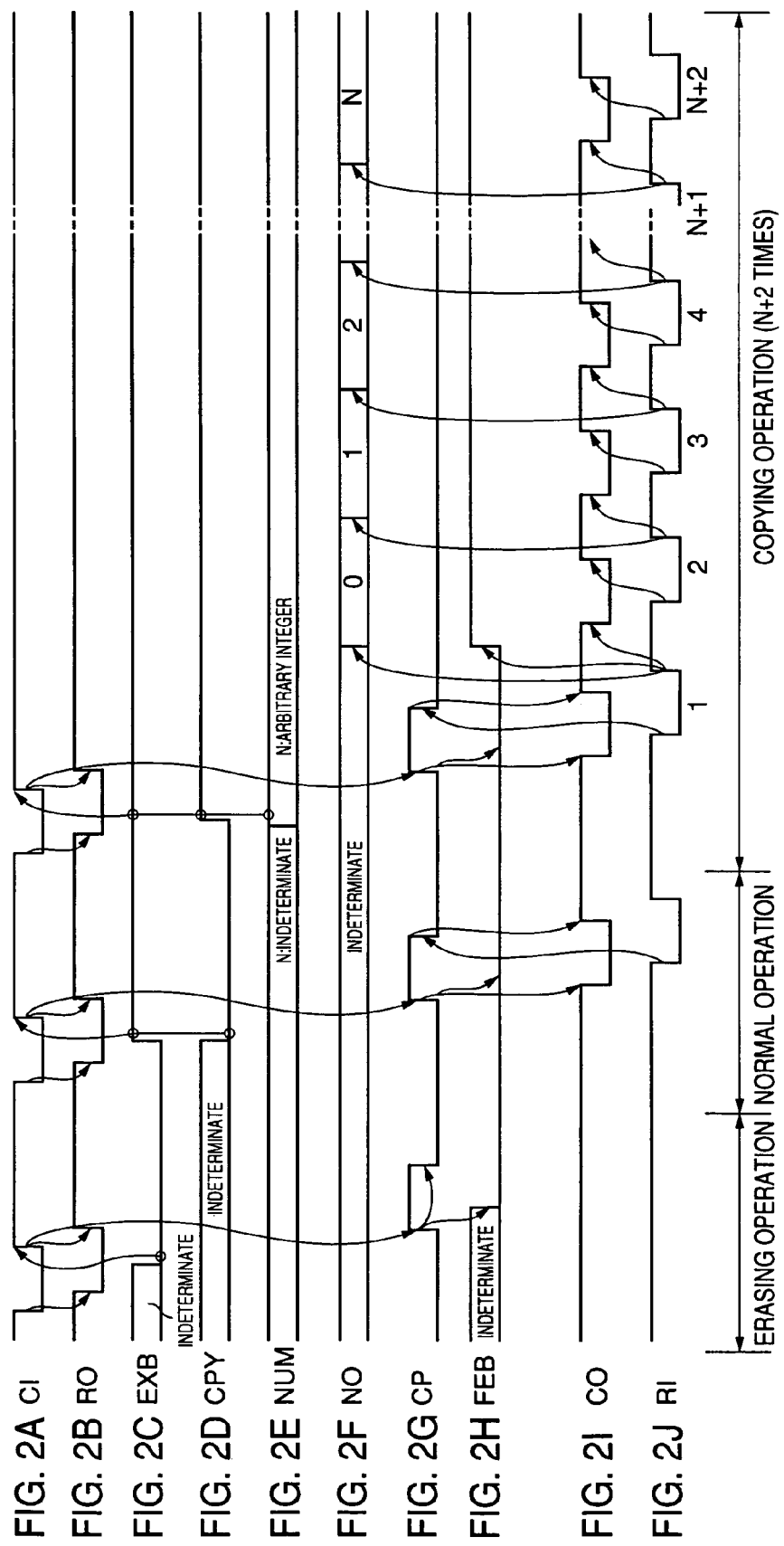
FIGS. 2A to 2J are timing charts illustrating the operation of the self-synchronous transfer control circuit shown in FIG. 1.

It is noted that, as clearly shown in FIG. 2, terminal CO is maintained at the "H" level during the erasing operation, and thus the packet will not be transferred to the subsequent stage, but be overwritten by the next packet transferred from the preceding stage and disappears.

The packet normal transfer operation of the self-synchronous transfer control circuit will now be described. In a state where an "H" level signal is input from terminal EXB and an "L" level signal is input from terminal CPY, when a pulse signal of "L" level is input from pulse input terminal CI of the self-synchronous transfer control circuit, a pulse signal of "L" level is input to pulse input terminal CI of C element $9a$, C element $9a$ operating as in the conventional example, and when the signal at terminal CI is raised to "H" level after a certain period of time, a "L" level signal is output from pulse output terminal CO of C element $9a$. Further, a signal of the "H" level is output from pulse output terminal CP to the pipeline register. The "H" level signal from pulse output terminal CP of C element $9a$ sets flip-flop $9s$, outputting an "L" level signal to terminal FEB via delay element $9t$.

Moreover, in synchronization with the rise of the signal at pulse output terminal CP, D type flip-flop $9c$ takes in the "H" level signal which has been input from terminal EXB and delivers the signal to output Q of D type flip-flop $9c$. Further, D type flip-flop $9d$ takes in the "L" level signal indicated in FIG. 2D that has been input from terminal CPY at the same timing, and delivers the signal to output Q of D type flip-flop $9d$. The "L" level signal output from D type flip-flop $9d$ is input to NAND gate $9i$, raising the output of NAND gate $9i$ to "H" level. Also, because terminal CO of C element $9b$ is at the "H" level in the initial state, the output of OR gate $9n$ and therefore of AND gate $9j$ will be at the "H" level. Pulse input terminal CI of C element $9b$ keeps receiving this "H" level signal, which prevents C element $9b$ from operating in this mode.

The output signal of the "H" level from D type flip-flop $9c$ is input to NAND gate $9k$, so that the output of NAND gate $9k$ will output an inversion signal of the signal output from inverter $9h$, i.e. a signal identical to the output of terminal CO of C element $9a$. Further, terminal CO of C element $9b$ is fixed to "H" level, so that the signal output from NAND gate $9k$ is input to NAND gate $9p$ and is output from NAND gate $9p$ as it is. That is, a signal identical to the output signal of terminal CO of C element $9a$ will be output from terminal CO of the self-synchronous transfer control circuit. The output signal of "H" level from D type flip-flop 9c is also input to OR gate 9l, fixing the output of OR gate to the "H" level.

Furthermore, D type flip-flop 9g maintains the state where master reset signal MRB is input, so that output Q thereof will be at the "L" level and the output of inverter 9q will be at the "H" level, and hence the output of AND gate 9m will be a signal identical to the signal input from terminal RI of the self-synchronous transfer control circuit. This means that a signal identical to the signal input from terminal RI of the self-synchronous transfer control circuit will be input to terminal RI of C element 9a. When terminal CP of C element 9a described above is changed to the "H" level, the terminal CO of C element 9a is changed to "L" level to be output, resulting that an "L" level signal is output from terminal CO of the self-synchronous transfer control circuit.

After a certain time period, the "L" level signal is input from terminal RI of the self-synchronous transfer control circuit, and thus the "L" level signal is input to terminal RI of C element 9a. This changes the signal at terminal CP of C element 9a to "L" level for being output, changing the signal at terminal CO of the C element 9a, i.e. the output from terminal CO of the self-synchronous transfer control circuit, to "H" level. The "H" level signal is then input from terminal RI of the self-synchronous transfer control circuit after a certain time period, generating a state where the subsequent data transfer is permitted, and thus the packet normal transfer operation of the self-synchronous transfer control circuit is terminated.

Finally, the packet copying operation of the self-synchronous transfer control circuit will be described. An "H" level signal is input from terminal EXB, an "H" level signal is input from terminal CPY, and packet copying number information is input from terminal NUM. In this state, when a pulse signal of "L" level is input from pulse input terminal CI of the self-synchronous transfer control circuit, a pulse signal of "L" level is input to pulse input terminal CI of C element 9a, C element 9a operating as in the conventional example. When terminal CI is raised to "H" level after a certain period of time, a signal of "L" level is output from pulse output terminal CO of C element 9a.

Further, the signal level at pulse output terminal CP for the pipeline register is changed from "L" to "H" for being output. The signal of "H" level from terminal CP of C element 9a sets flip-flop 9s, outputting an "L" level signal to terminal FEB of counter 9f via delay element 9t.

Further, in synchronization with the rise of the signal at terminal CP, D type flip-flop 9c takes in the "H" level signal which has been input from terminal EXB and outputs the signal from output Q thereof.

Moreover, D type flip-flop 9d takes in the "H" level signal which has been input from terminal CPY at the same timing and takes out the signal at output Q of D type flip-flop 9d, whereas D type flip-flop 9e takes in an integer indicating the copying number information that has been input from terminal NUM at the same timing, as shown in FIG. 2E, and takes out the signal from output Q of the same D type flip-flop 9e. D type flip-flop 9e shown in FIG. 1 is constituted by a plurality of D type flip-flops aligned in parallel, and when, for example, the copying number information is five, three-bit information of "101" is input using three D type flip-flops for each bit.

Counter 9f takes in the output of delay element 9t, i.e. the output of D type flip-flop 9e indicating the copying number information when the FEB signal is at "L" level, and when the FEB signal is subsequently raised to "H" level, counter 9f executes counting every time a clock is input to terminal CK, outputs the counted value from terminal N to terminal NO, and outputs an "L" level signal from terminal Z. When the counted value corresponds to the number set from terminal NUM, counter 9f stops the counting, which makes the output of terminal Z "H" level.

Terminal CP of C element 9a is changed to "H" level, and thus the output of terminal CO of C element 9a is changed to "L" level, the signal being input to inverter 9h, which outputs an "H" level signal. The "H" level signal at the output of inverter 9h is input to NAND gate 9k, and also an "H" level signal is input to the other input terminal from output Q of D type flip-flop 9c, so that the output of NAND gate 9k will be at "L" level. The "L" level signal is input to AND gate 9p, which therefore outputs the "L" level signal. That is, the self-synchronous transfer control circuit outputs the "L" level signal from terminal CO. Then, after a certain period of time, the "L" level signal will be input from terminal RI of the self-synchronous transfer control circuit.

The "H" level signal at the output of inverter 9h is also input to NAND gate 9i. Further, D type flip-flops 9c and 9d both output "H" level signals, which makes the output of NAND gate 9i "L" level. The "L" level signal is input to AND gate 9j, outputting the "L" level signal, which will be applied to pulse input terminal CI of C element 9b. This changes the signal level at transmission enabling output terminal RO of C element 9b to "L" level for being output, and the signal is input to set terminal S of D type flip-flop 9g to asynchronously set the same, resulting that an "H" level signal is output from output Q of D type flip-flop 9g. The "H" level signal is input to inverter 9q, the output thereof being "L" level. The "L" level signal is input to AND gate 9m.

The "L" level signal input from terminal RI of the self-synchronous transfer control circuit is input to AND gate 9m. The output of AND gate 9m will be at "L" level, and the "L" level signal will then be input to terminal RI of C element 9a. This changes the signal level at terminal CP of C element 9a to "L" for being output, and changes the signal level of terminal CO of C element 9a to "H" to the contrary.

Further, when the "L" level signal input from terminal RI of the self-synchronous transfer control circuit is input to terminal RI of C element 9b, terminal CO of C element 9b is changed to "H" level. When the "H" level signal is output from terminal CO of C element 9a, the "H" level signal is applied to AND gate 9p via inverter 9h and NAND gate 9k. Because terminal CO of C element 9b is at "H" level, the "H" level signal is output from AND gate 9p to terminal CO of the self-synchronous transfer control circuit.

After a predetermined period of time, terminal RI of the self-synchronous transfer control circuit is changed from "L" level to "H" level for being input, terminating the transfer of the first packet. At that time, an "L" level signal is output from terminal FEB, and the output from terminal NO will be indeterminate, since counter 9f is not operating.

Whereas, the "H" level signal output from terminal CO of C element 9a is separately applied to AND gate 9j via inverter 9h and NAND gate 9i. At this time point, terminal CO of C element 9b is at "H" level, making the output of OR gate 9n the "H" level, and therefore the output of AND gate 9j will also be at the "H" level, and the "H" level signal will be input to terminal CI of C element 9b. Thus, the signal level at terminal RI of the self-synchronous transfer control circuit is changed from "L" to "H", fulfilling the conditions in that C element 9b operates as in the conventional example, and hence terminal CP of C element 9b is raised from "L" level to "H" level.

On the other hand, terminal CO of C element 9b falls from "H" level to "L" level. The "H" level signal of the output of terminal CP of C element 9b sets flip-flop 9s, so that the "H" level signal is output from terminal FEB of the self-synchronous transfer control circuit via delay element 9t. Thereafter, counter 9f counts up from 0 by a rising signal of terminal CP of C element 9b. Counter 9f outputs the counted result of "0" from terminal NO, outputting an "H" level signal from terminal Z of counter 9f if it corresponds to the number set by input terminal NUM, and outputting an "L" level signal if there is no correspondence.

A case where no correspondence is found between the counted result and the set number will now be discussed. At that time, the "L" level signal is output from terminal Z of counter 9f, and is therefore input to OR gate 9n. As described earlier, AND gate 9m is masked by the "L" level signal of the output from inverter 9q, so that terminal RI of C element 9a is fixed to the "L" level, and terminal CO of C element 9a is fixed to "H" level. This makes the output of NAND gate 9i "H" level, and thus the output of OR gate 9n passes through AND gate 9j as it is.

Therefore, the signal output from terminal CO of C element 9b is input to terminal CI of C element 9b maintaining its level. Likewise, terminal CO of C element 9a is fixed to "H" level, allowing AND gate 9p to output the signal output from terminal CO of C element 9b without change of its level from terminal CO of the self-synchronous transfer control circuit. Because the "L" level signal is output from terminal CO of C element 9b, the second "L" level signal is output from terminal CO of the self-synchronous transfer control circuit. Further, an "L" level signal is input to terminal CI of C element 9b via OR gate 9n and AND gate 9j.

After a certain period of time, an "L" level signal is input to terminal RI of the self-synchronous transfer control circuit, and thus an "L" level signal will be input to terminal RI of C element 9b. This changes the signal level of terminal CP of C element 9b from "H" to "L", and that of terminal CO of C element 9b from "L" to "H". The "H" level signal output from terminal CO of C element 9b is output from terminal CO of the self-synchronous transfer circuit as the "H" level signal via gate 9p, while being input to terminal CI of C element 9b also as the "H" level via OR gate 9n and AND gate 9j. When the signal level at terminal RI of the self-synchronous transfer control circuit is changed from "L" to "H" after a certain period of time, the second packet transfer is terminated. At that time, terminal FEB outputs an "H" level signal, and terminal NO outputs a "0" level signal.

The "H" level signal input from terminal RI of the self-synchronous transfer control circuit is input to terminal RI of C element 9b, so that conditions are matched where C element 9b operates as in the conventional example, as described in the earlier second packet transfer, the signal level of terminal CP of C element 9b rising from "L" to "H", and that of terminal CO of C element 9b falling from "H" level to "L" level. Counter 9f counts up from "0" to "1" upon the rise of the signal at terminal CP of C element 9b, comparing the counted result with the number set at terminal NUM. The self-synchronous transfer control circuit compares the number of counting executed by counter 9f and the set number input from terminal NUM, repeats the above operation until they correspond with each other, and keeps outputting pulse signals from terminal CO of the self-synchronous transfer control circuit.

A case where the number of counting counted by counter 9f and the set number input from terminal NUM correspond with each other will now be discussed. At that time, an "H" level signal is output from terminal Z of counter 9f, and the output of OR gate 9n is fixed to the "H" level. The "H" level signal of the output of OR gate 9n is fixed to a state where terminal CI of C element 9b is raised to the "H" level via gate 9j, so that no pulse will be output from C element 9b. Further, terminal CP of C element 9b is then fixed to the "H" level, and terminal CO of C element 9b is fixed to a state where "L" level is output therefrom. This is the state where the "L" level signal for transferring the last copy packet is output from terminal CO of the self-synchronous transfer control circuit.

An "L" level signal is input from terminal RI of the self-synchronous transfer control circuit after a certain period of time, and thus the "L" level signal is input to terminal RI of C element 9b. C element 9b receives the signal, changing the level of terminal CP of C element 9b from "H" to "L", and that of terminal CO of C element 9b from "L" to "H". This allows terminal CO of the self-synchronous transfer control circuit to output an "H" level signal. Further, D type flip-flop 9g takes in a signal at input terminal D synchronously with the rise of the signal at terminal CP of C element 9b (the rise via inverter 9r), and takes out the signal from output terminal Q of D type flip-flop 9g.

The input signal of D type flip-flop 9g is then at "L" level via inverter 9u, since output signal Z of counter 9f is at "H" level. That is, Q output of D type flip-flop 9g takes out an "L" level signal, and the output of inverter 9q rises to "H" level. This "H" level signal is input to AND gate 9m, and the output thereof, which had been fixed to "L" level heretofore, is changed to a signal identical to the signal input from terminal RI of the self-synchronous transfer control circuit.

Subsequently, terminal CO of the self-synchronous transfer control circuit outputs an "H" level signal, so that the "H" level signal is input to terminal RI of the self-synchronous transfer control circuit after an additional certain time period. This input signal of "H" level passes through AND gate 9m and is input to terminal RI of C element 9a.

After such a series of operations, the copying operation of the self-synchronous transfer control circuit is terminated. When one pulse is applied to pulse input terminal CI of the self-synchronous transfer control circuit from the preceding stage, this circuit can output one pulse from terminal CP, and output any arbitrary number of pulse signals from pulse output terminal CO to the subsequent stage.

Though the copying operation was described with reference to FIG. 2, it is noted that the self-synchronous transfer control circuit continues the packet transfer operation as described above, such that, when N is input as the copying number information, the initial packet transfer operation is performed and thereafter counting is executed from 0, 1, 2, . . . to N. Therefore, N+2 packets are transferred. Conversely, if N copies are required, "N−2" will be input as the copying number information.

Figure 3:
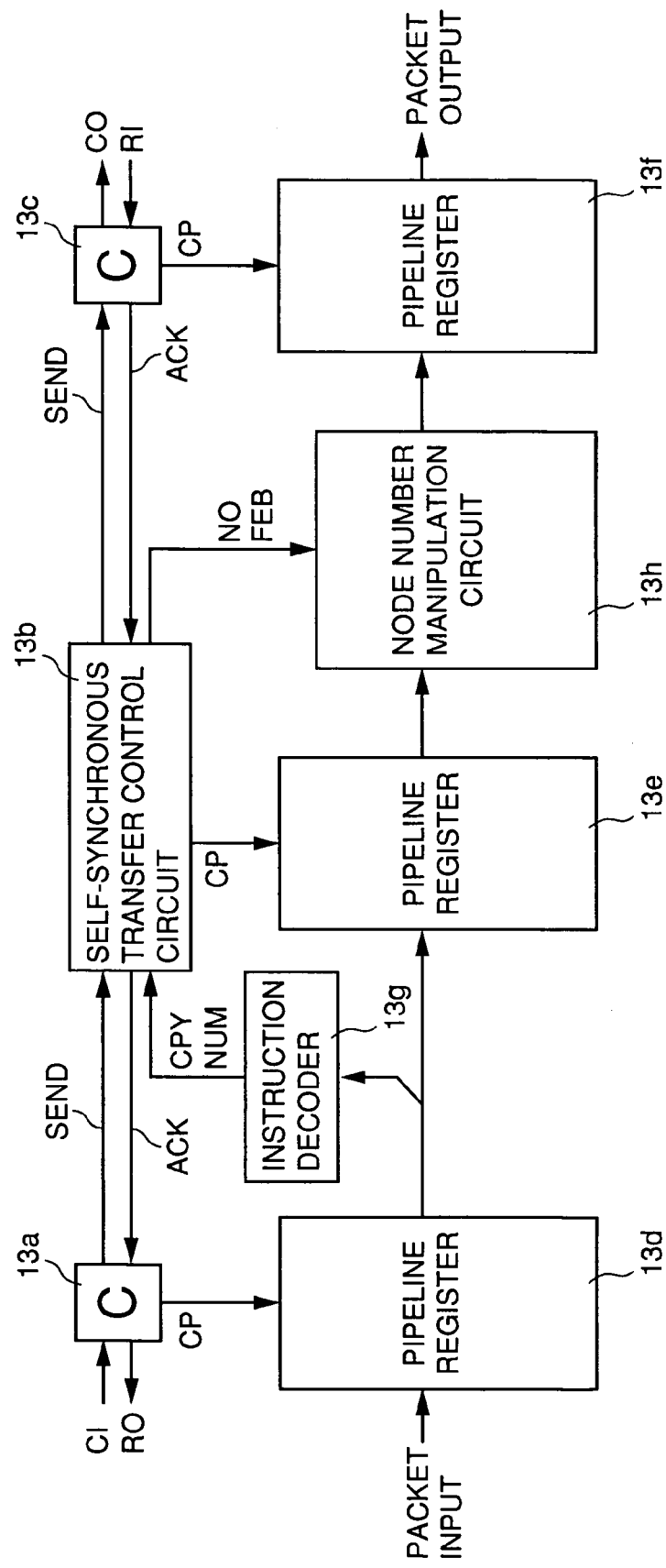
FIG. 3 is a block diagram illustrating a process procedure for making N copies of an input data, according to the second embodiment of the present invention.

FIG. 3 is a block diagram showing an example where the self-synchronous transfer control circuit in the second embodiment of the present invention is used for a data transmission device employing a handshake system. In the data transmission device shown in FIG. 3, self-synchronous transfer control circuit 13b shown in FIG. 1 is connected between C elements 13a and 13c, an instruction decoder 13g is provided between pipeline registers 13d and 13e, and a node number manipulation circuit 13h is provided between pipeline registers 13e and 13f. The packet data to be input to the data transmission device includes a destination node number, a generation number, an instruction code and data, as described above with reference to FIG. 12.

When the data transfer from C element 13a to self-synchronous transfer control circuit 13b is realized, instruction decoder 13g decodes the instruction code, providing a CPY flag and copying number information NUM to self-synchronous transfer control circuit 13b. Self-synchronous transfer control circuit 13b controls the data transfer for C element 13c in the subsequent stage in accordance with the CPY flag and copying number information NUM to be input.

Self-synchronous transfer control circuit 13b outputs one pulse signal from terminal CP when the SEND signal and the ACK signal between the circuit 13b and C element 13c in the subsequent stage are both in the "H" level and when the SEND signal from C element 13a in the preceding stage rises from "L" level to "H" level. This allows the packet data input to pipeline register 13e to be transferred to pipeline register 13f together with the SEND pulse signal from self-synchronous transfer control circuit 13b to C element 13c.

C element 13c sends a data transfer enabling signal (ACK signal "H") to self-synchronous transfer control circuit 13b when the transfer of the first packet to C element (not shown) in the subsequent stage is completed. Self-synchronous transfer control circuit 13b which has received the signal in turn sends the subsequent SEND signal to C element 13c, and also the second packet data to pipeline register 13f.

At that time, self-synchronous transfer control circuit 13b outputs FEB signal "H" and NO signal "0", and node number manipulation circuit 13h manipulates the node number using these signals so as to distinguish the second packet data from the first packet data. For example, the FEB signal and the NO signal are added to the node number to distinguish the packets from each other. Thus, for the "n" th packet, a node number is applied using the FEB signal and the NO signal such that the packet can be distinguished the other copy packets. Using a COPYn instruction, the input of one packet can output a plurality of packets holding the same data.

Figure 4B:
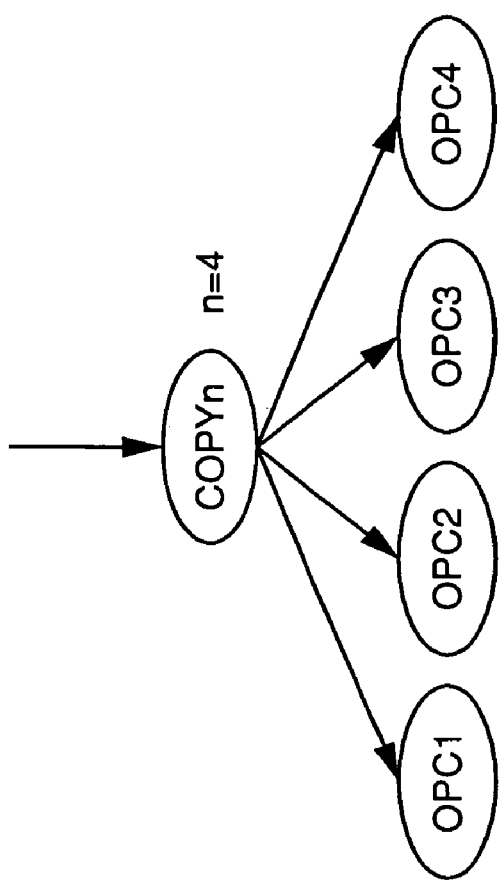
FIGS. 4A and 4B are flow diagrams contrastively showing process procedures making four copies of the input data, according to a conventional example and to the second embodiment of the present invention.
Figure 4A:
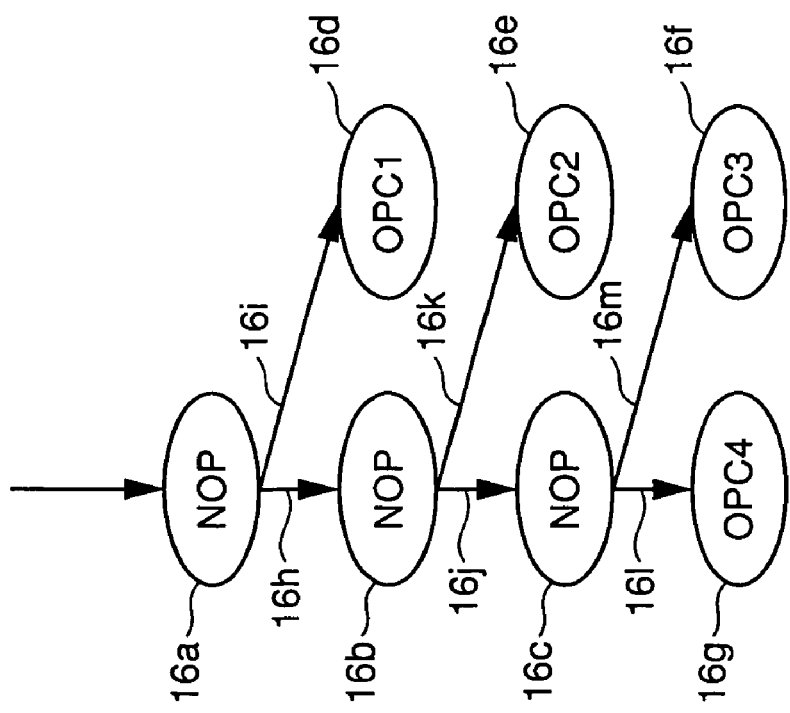

FIGS. 4A and 4B contrastively shows programs for an example where four copies of packets are made in a conventional example and in the embodiment of the present invention. In the conventional example, only up to two copies could be made from one node as shown in FIG. 4A, whereas a plurality of copies can be made by the COPYn instruction according to the embodiment of the present invention as shown in FIG. 4B, resulting in reduction of the number of executive instructions.

Figure 12:
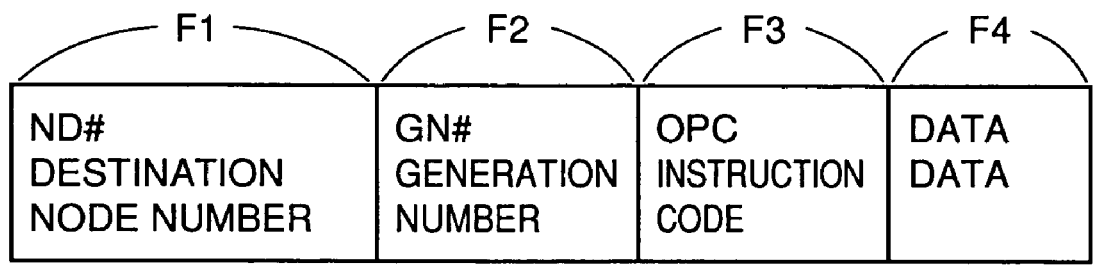
FIG. 12 shows a format of a data packet applied to a conventional example and an embodiment of the present invention.
Figure 15:
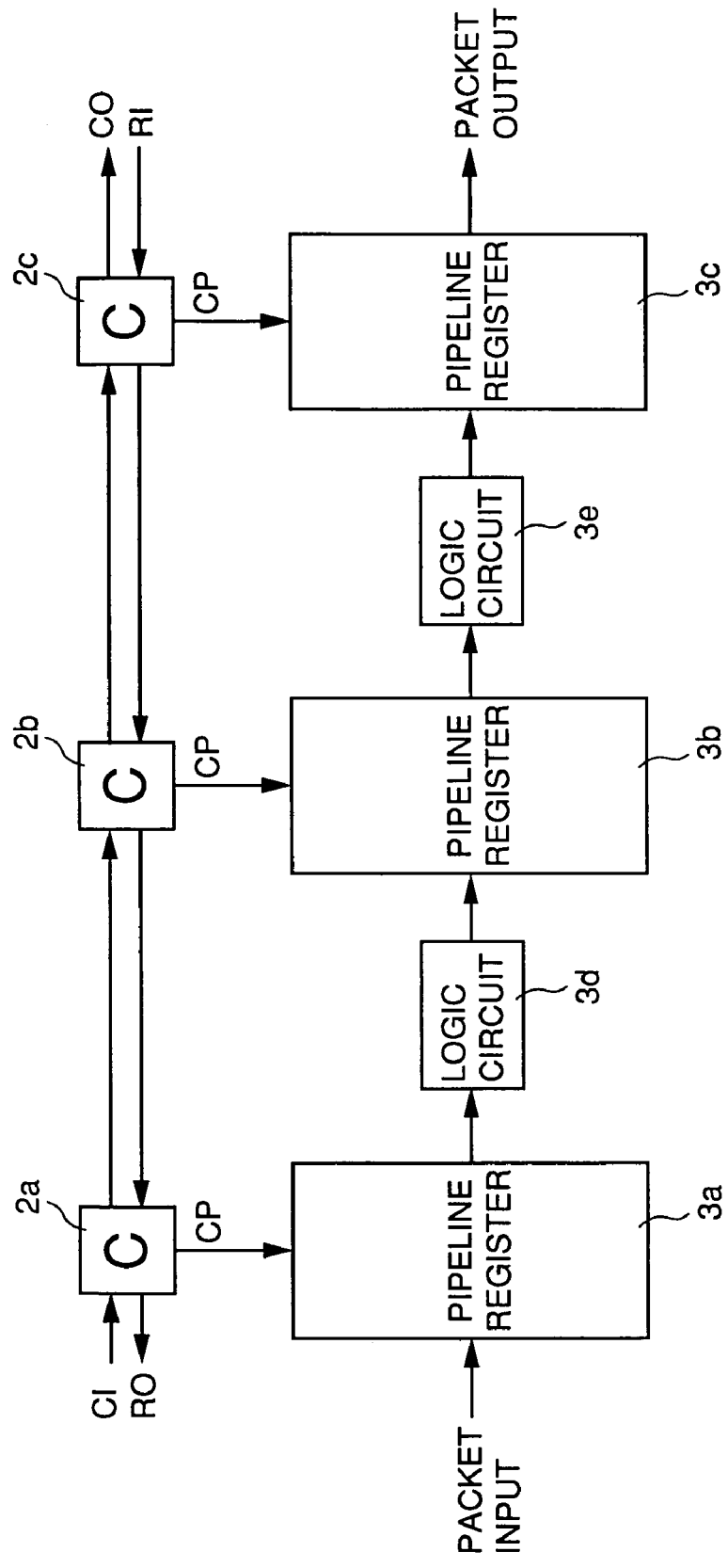
FIG. 15 is a block diagram showing a conventional general data driven device.
Figure 16:
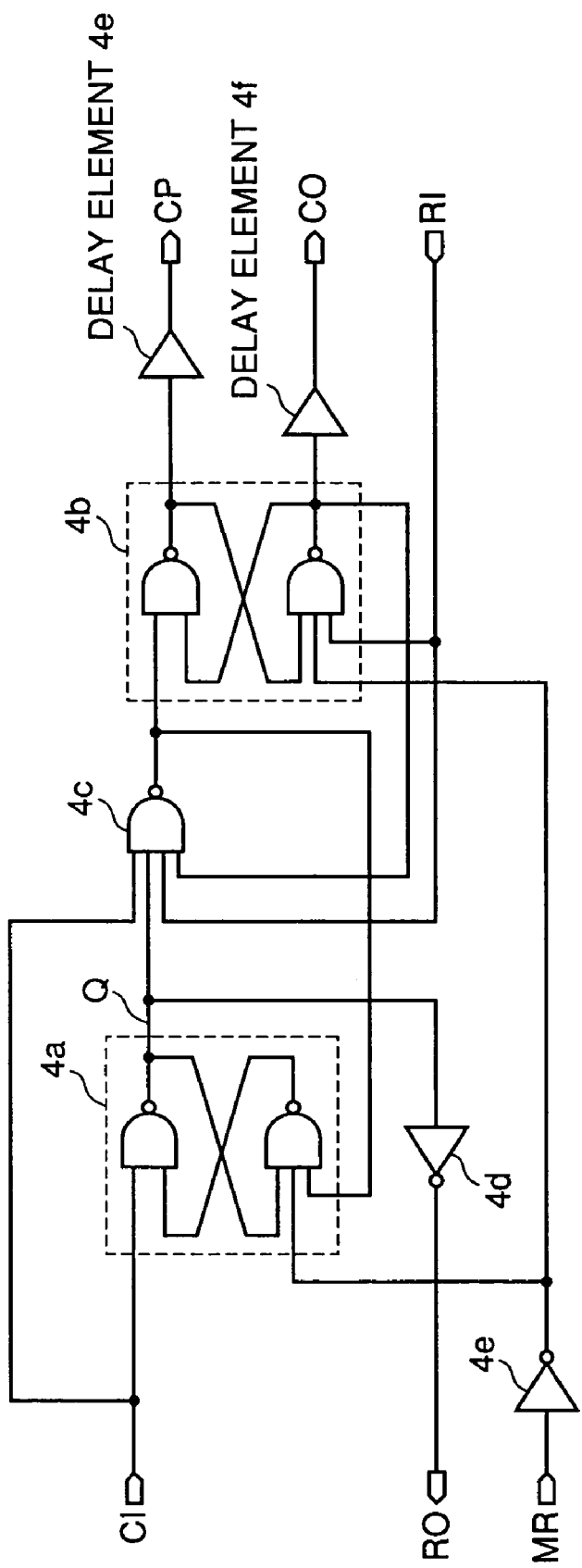
FIG. 16 is a circuit diagram showing a conventional C element.

Before describing other examples of the data transmission device using the self-synchronous transfer control circuit according to the present invention, an efficient processing method of the instruction by which the operation result causes an overflow. For example, multiplication of two sets of 12-bit data is discussed. In such a case, though the operation result would be 24-bit data, the data stored in the data field as a packet format shown in FIG. 12 is limited to 12 bits, so that the operation result data of 24 bits could not be stored as one packet only.

Figure 18:
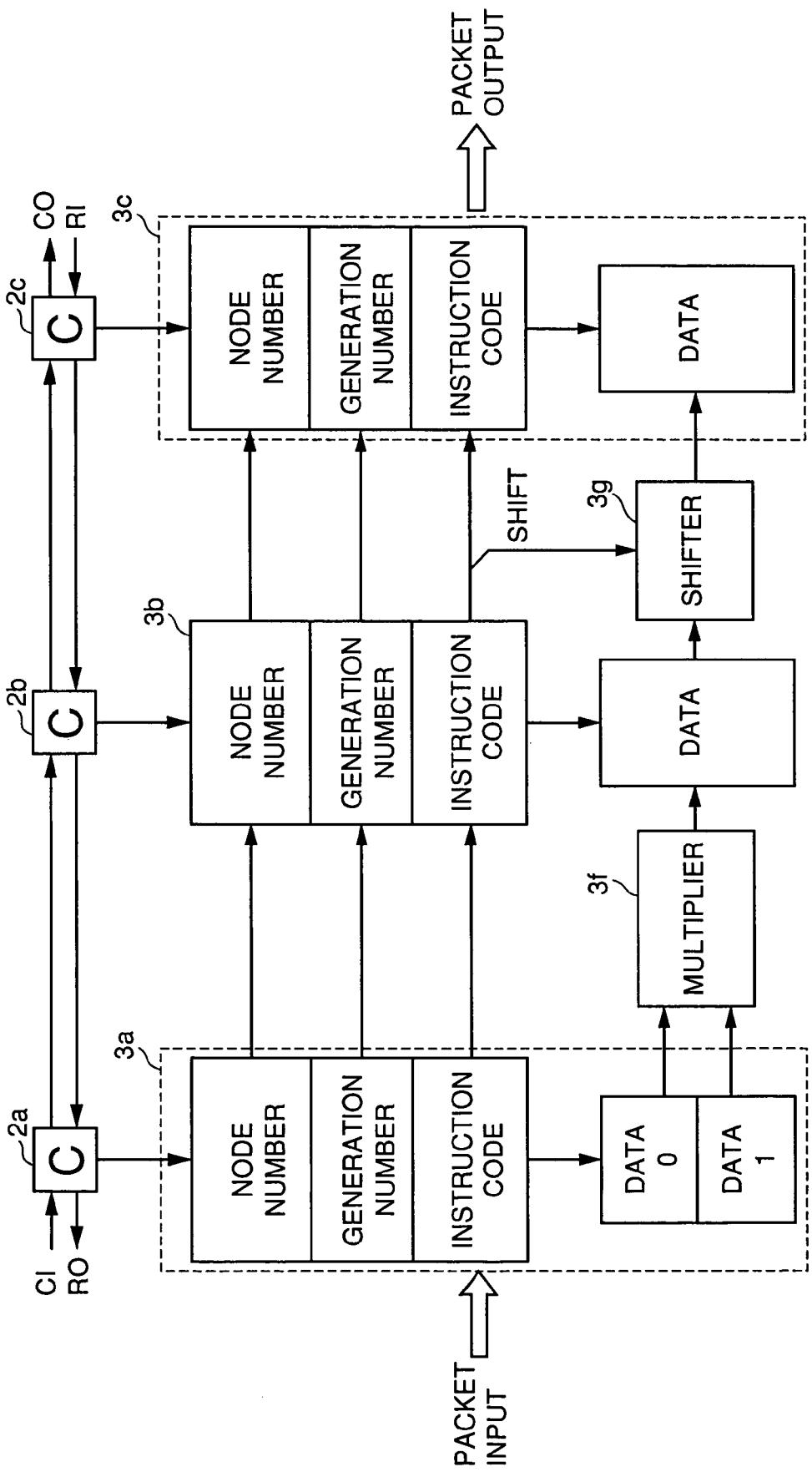
FIG. 18 shows an example where a multiplication instruction is executed in a conventional data driven processor.

In the conventional example described above with reference to FIG. 18, therefore, the operation result data of 24 bits were required to be divided into higher 12 bits and lower 12 bits for operation. For this purpose, in the conventional example shown in FIG. 18, the operation was realized by executing two instructions such as an instruction outputting a packet including the higher 12-bit data and an instruction outputting a packet including the lower 12-bit data by adjusting a shift. An embodiment for improving this will be described below.

Figure 5:
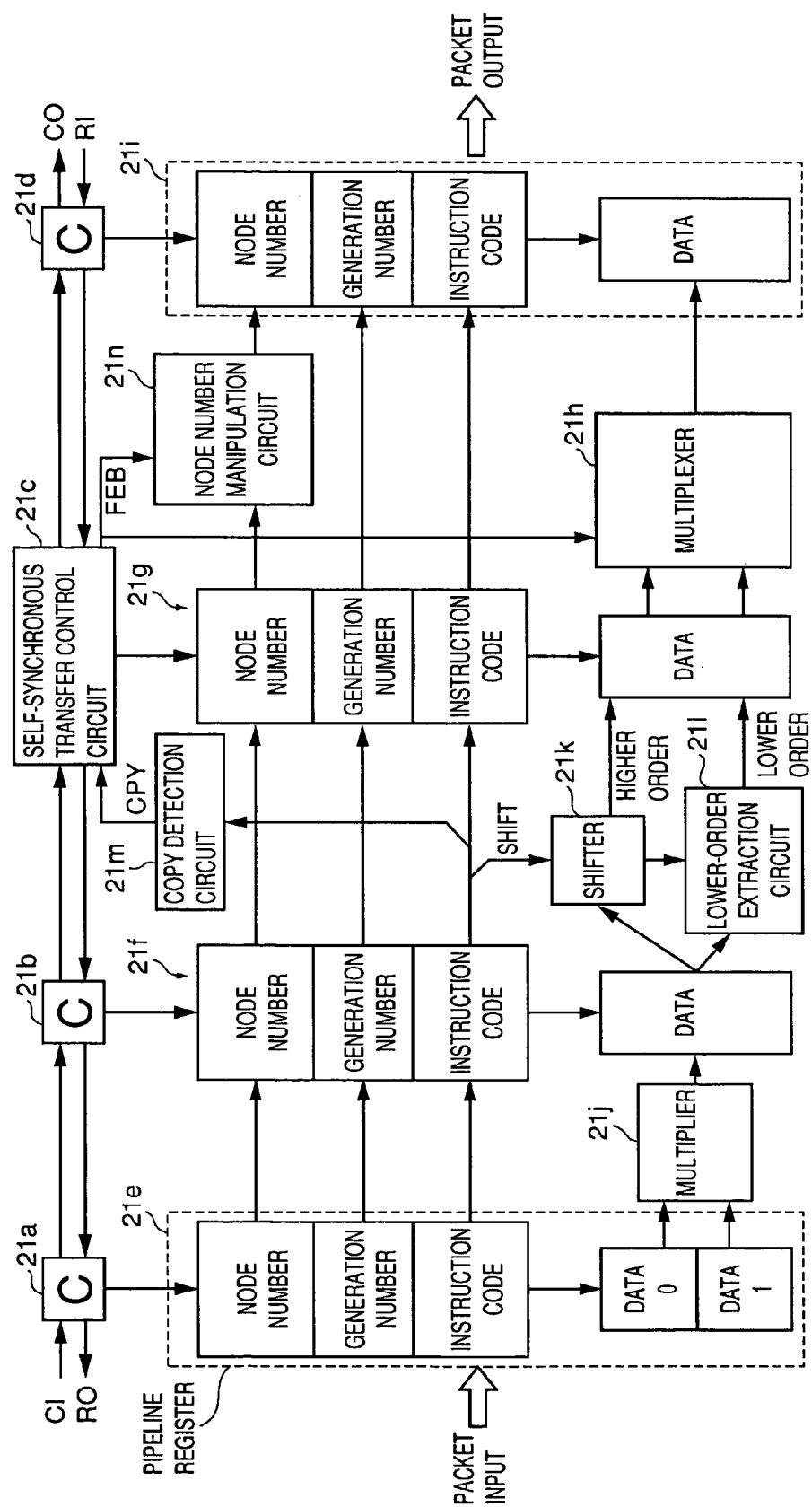
FIG. 5 is a block diagram showing a process content of a multiplication instruction in relation to a multiplication process causing an overflow, according to the third embodiment of the present invention.
Figure 6:
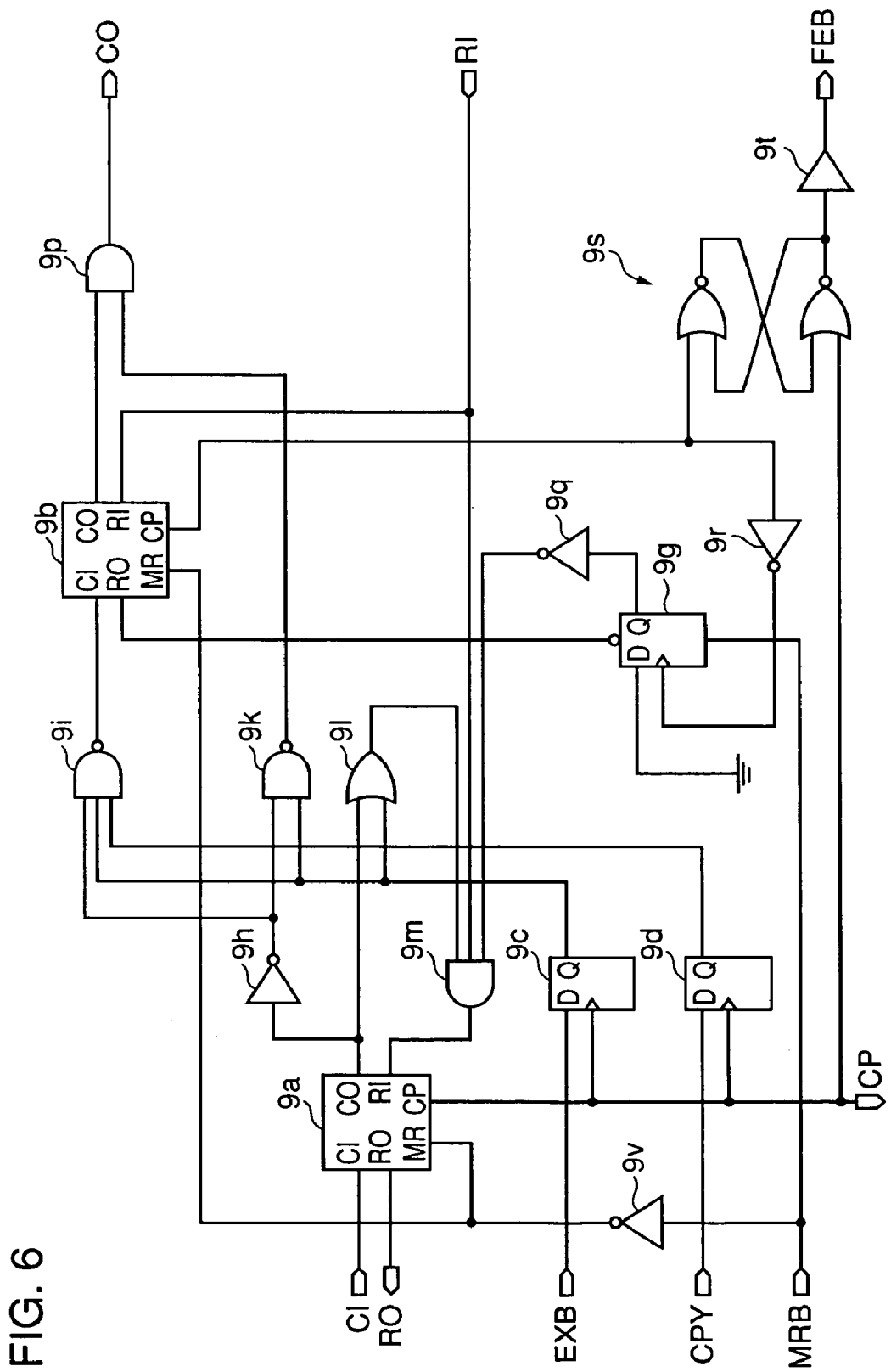
FIG. 6 is a detailed circuit diagram of the self-synchronous transfer control circuit shown in FIG. 5.

FIG. 5 is a block diagram executing a multiplication instruction by a data transmission device employing a handshake system, including a new self-synchronous transfer control circuit 21c of the present invention, and FIG. 6 is a circuit diagram showing an example where self-synchronous transfer control circuit 21c shown in FIG. 5 is realized.

In FIG. 5, a transfer control circuit is constituted by C elements 21a and 21b, self-synchronous transfer control circuit 21c, and a C element 21d connected in series. Pipeline registers 21e, 21f, 21g and 21i constitute a data transmission path, in which a multiplier 21j is connected between pipeline registers 21e and 21f, and a shifter 21k, a lower-order extraction circuit 21l and a copy detection circuit 21m are provided between pipeline registers 21f and 21g. Further, a multiplexer 21h and a node number manipulation circuit 21n are provided between pipeline registers 21g and 21i. Though the example shown in FIG. 1 may be used for self-synchronous transfer control circuit 21c, the self-synchronous transfer control circuit shown in FIG. 6 is used in the present embodiment. N copies were possible in the self-synchronous transfer control circuit shown in FIG. 1, whereas N is limited to 2 in the self-synchronous transfer control circuit shown in FIG. 6, simplifying the configuration compared to the one in FIG. 1.

In FIG. 6, the configuration is similar to that shown in FIG. 1, except for terminal NUM, terminal NO, D type flip-flop 9e, counter 9f, AND gate 9j, OR gate 9n and inverter 9u. Further, FIGS. 7A to 7H are timing charts showing the operation of the circuit shown in FIG. 6.

Figure 17:
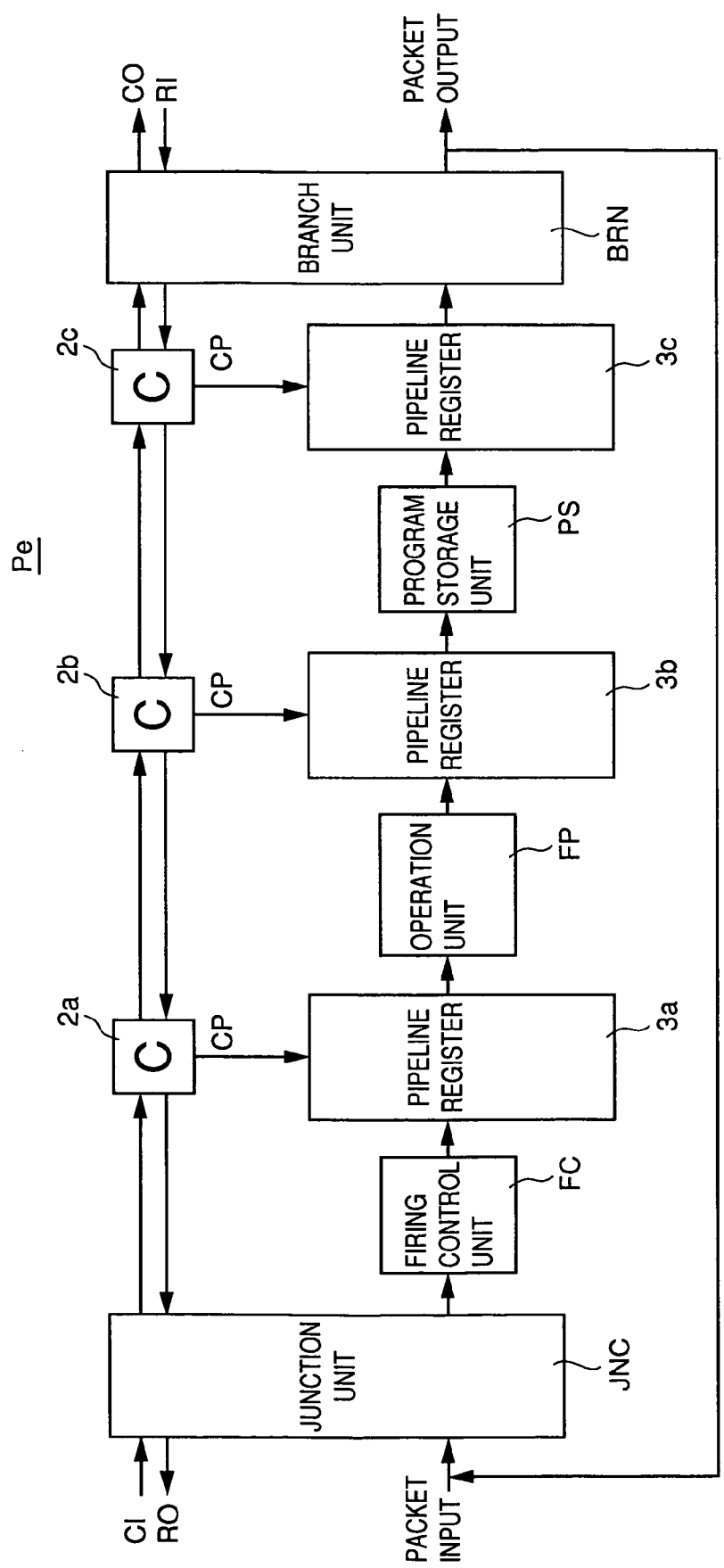
FIG. 17 is a block diagram showing a conventional data driven processor.

The data transmission device shown in FIG. 5 is included in operation unit FP of the data driven processor shown in FIG. 17. The packet to be input to operation unit FP of the data driven processor stores a pair of data (two sets of 12-bit data) to be subjected to the operation. The packet including two non-operated data of 12 bits is input to pipeline register 21e, the operation is executed by multiplier 21j, and the operation result of 24-bit data is temporarily stored in the data field of the packet, which is held in pipeline register 21f. The 24-bit data is output from pipeline register 21f, and divided into the higher 12-bit data and the lower 12-bit data by shifter 21k and lower-order extraction circuit 21l, in accordance with the shift read from the instruction code, to be output to pipeline register 21g.

Furthermore, copy flag CPY is read from the instruction code by copy detection circuit 21m and is provided to self-synchronous transfer control circuit 21c. Self-synchronous transfer control circuit 21c outputs a CP pulse signal to pipeline register 21g when the "H" level signal indicating the detection of copying is input to terminal CPY, exchanging the SEND signal and the ACK signal with C element 21d twice, and sends two packets to pipeline register 21i as a result.

The first packet is output with the "H" level of the FEB signal, whereas the second packet is output with the "H" level of the FEB signal. Using the FEB signal, the node numbers are manipulated by node number manipulation circuit 21n to distinguish the packets from each other while the output of multiplexer 21h, to which the higher 12-bit data and the lower 12-bit data of the operation result are input, is switched.

Thus, the first packet transferred from pipeline register 21g to pipeline register 21i stores the higher 12 bits of the multiplication result, whereas the second packet, in which its node number is manipulated by, for example, incrementing thereof, stores the lower 12 bits of the multiplication result.

Figure 8B:
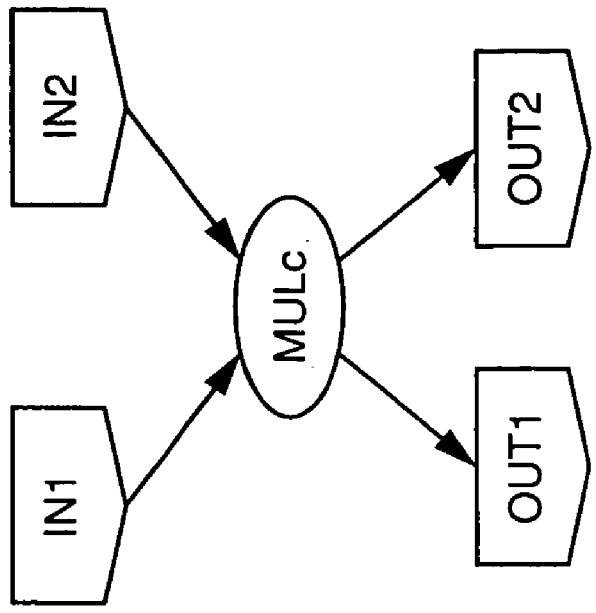
FIGS. 8A and 8B are flow diagrams contrastively showing the multiplication process causing the overflow, according to a conventional example and to the third embodiment of the present invention.
Figure 8A:
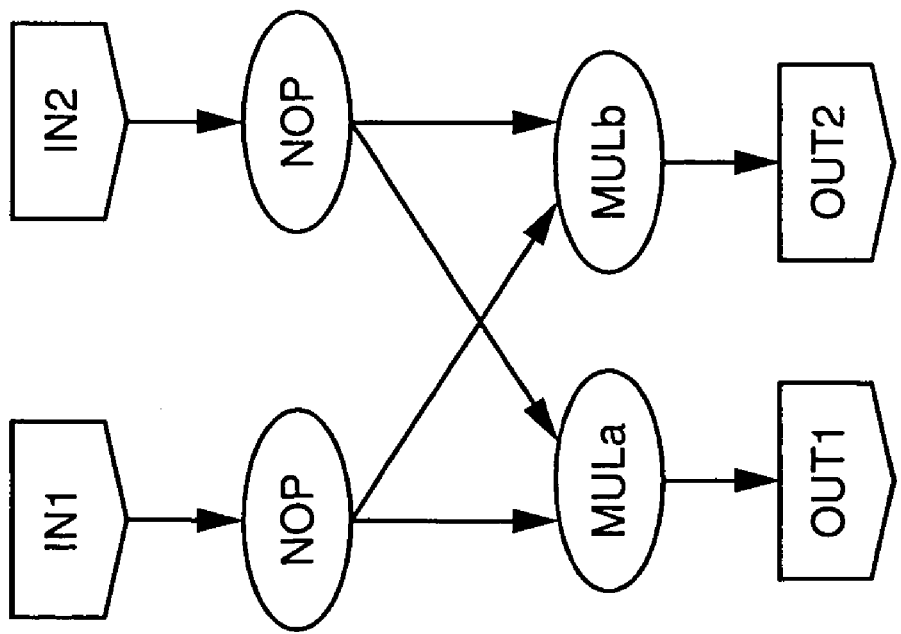

FIGS. 8A and 8B contrastively show flow diagrams for the multiplication between two sets of 12-bit data according to a conventional example and the third embodiment of the present invention.

Conventionally, as shown in FIG. 8A, an NOP instruction was executed to make two copies required for each of two sets of 12-bit data input from an input port IN1 and an input port IN2. Subsequently, an MULa (multiplication) instruction was executed to output the higher 12 bits of the multiplication result from an output port OUT1, and an MULb instruction was executed to output the lower 12 bits of the multiplication result from output port OUT2.

In contrast, an MULc instruction according to an embodiment of the present invention multiplies two sets of 12-bit data input from input ports IN1 and IN2 as shown in FIG. 8B, to output the higher 12 bits from output port OUT1 and the lower 12 bits from output port OUT2 as a result. Thus, the number of the steps for executive instructions has been reduced to a quarter of that in the conventional example, so that a simple calculation indicates that the operation speed four times as fast as that of the conventional case can be expected.

Figure 9:
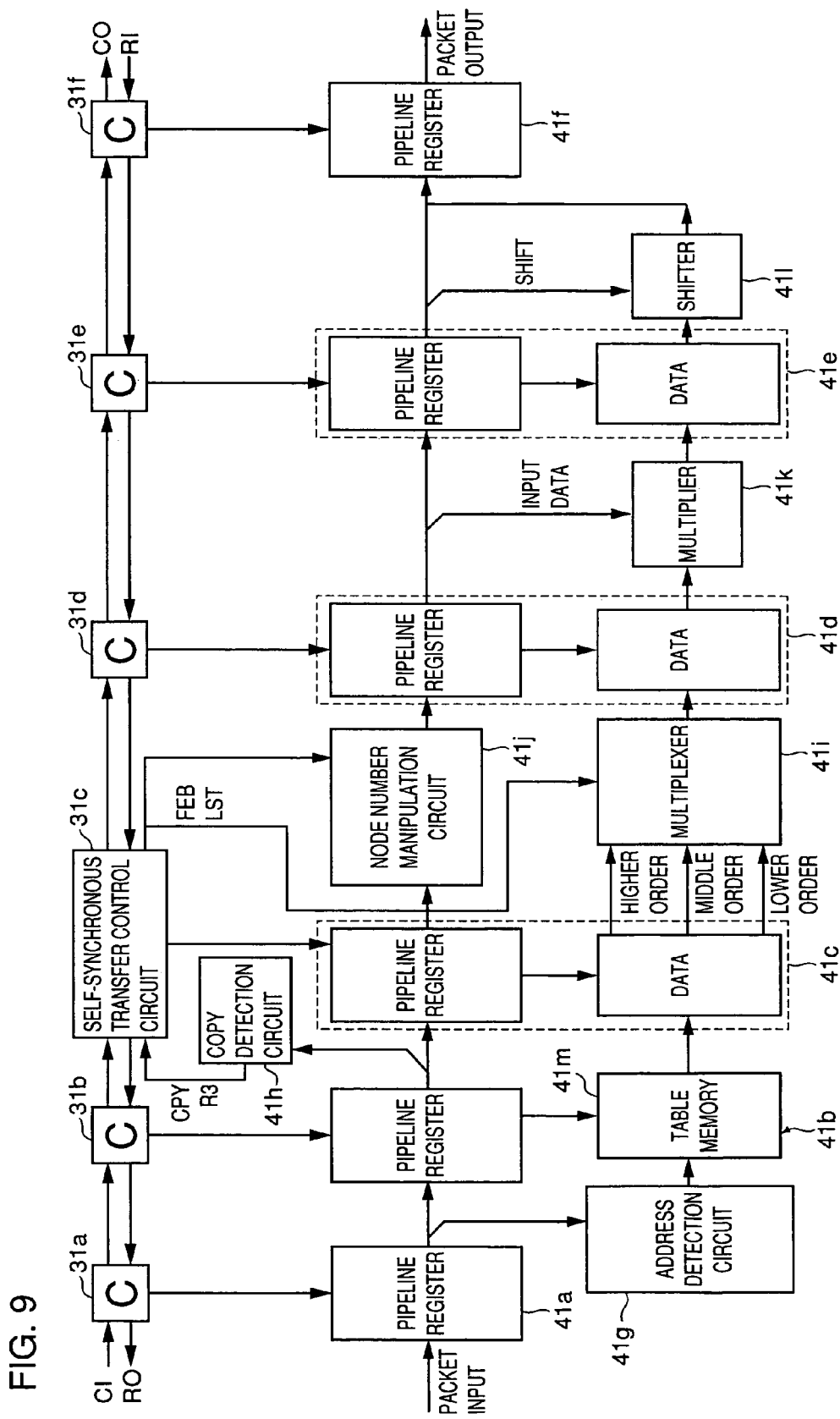
FIG. 9 is a block diagram illustrating a procedure simultaneously processing three data, according to the fourth embodiment of the present invention.
Figure 10:
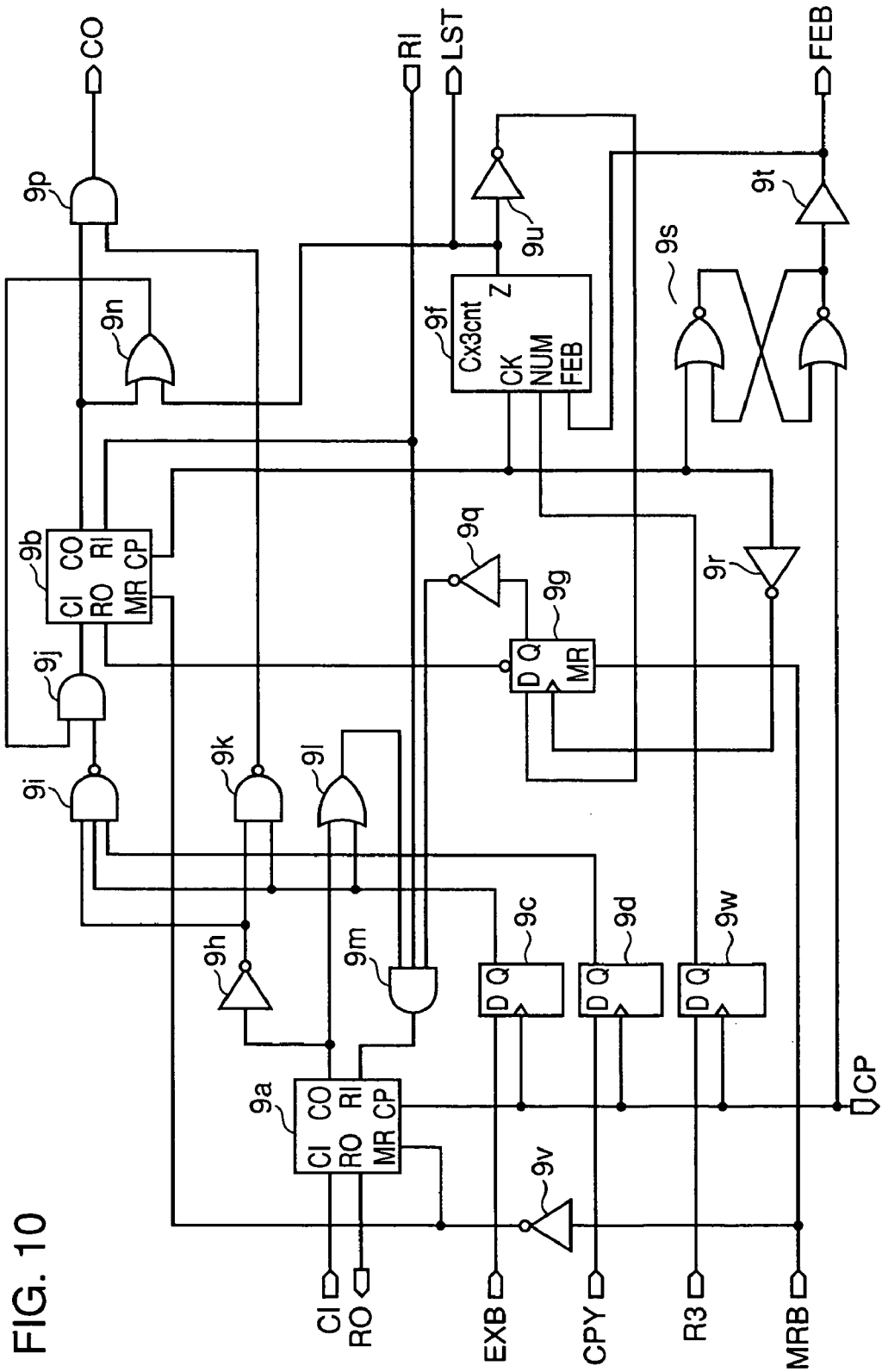
FIG. 10 is a detailed circuit diagram of the self-synchronous transfer control circuit shown in FIG. 9.
Figure 11:
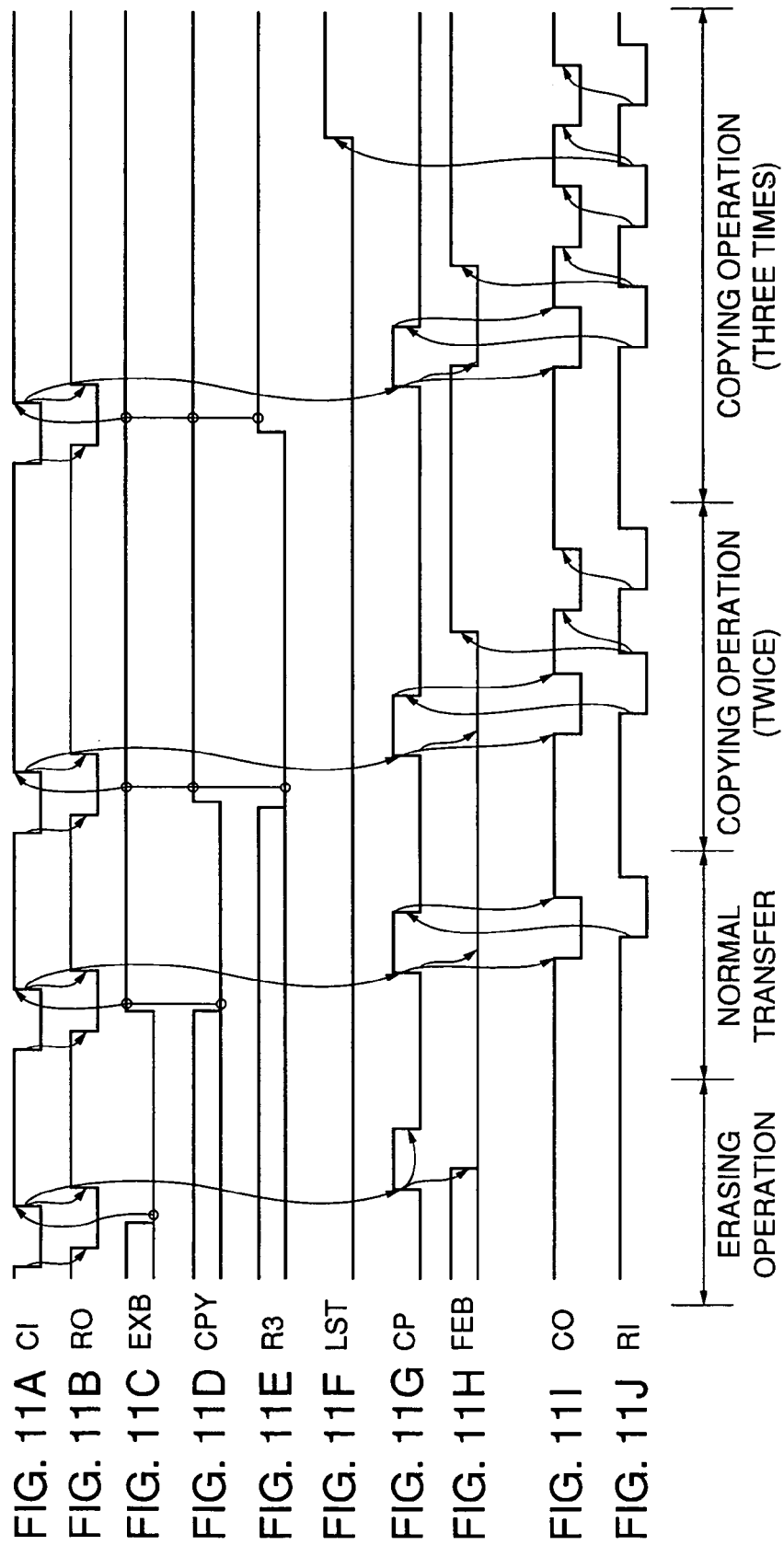
FIGS. 11A to 11J are timing charts illustrating the operation of the self-synchronous transfer control circuit shown in FIG. 10.

FIGS. 9 to 11 show the fourth embodiment of the present invention. In particular, FIG. 9 is a block diagram showing a data driven device performing efficient operation process of three sets of data, FIG. 10 is a circuit diagram of the self-synchronous transfer control circuit shown in FIG. 9, and FIGS. 11A to 11J are timing charts showing the operation of the self-synchronous transfer control circuit shown in FIG. 10.

Two sets of data were handled by one packet in the data transmission device according to the embodiment shown in FIG. 5 as described earlier, whereas in the embodiment shown in FIG. 9, one packet is input to execute operation for three sets of data, outputting three packets storing three operation results.

In FIG. 9, C elements 31a and 31b, a self-synchronous transfer control circuit 31c, and C elements 31d, 31e and 31f are connected in series as a transfer control circuit. Further, pipeline registers 41a to 41f are connected as a data transmission unit, in which an address detection circuit 41g is connected between pipeline registers 41a and 41b, a copy detection circuit 41h is connected between pipeline registers 41b and 41c, a multiplexer 41i and a node number manipulation circuit 41j are connected between pipeline registers 41c and 41d, a multiplier 41k is connected between pipeline registers 41d and 41e, and a shifter 41l is connected between pipeline registers 41e and 41f.

For self-synchronous transfer control circuit 31c, though a similar operation result could be obtained by inputting "H" level to terminal CPY and an "H" level signal to terminal NUM in the circuit shown in FIG. 1, the self-synchronous transfer control circuit shown in FIG. 10 can better simplify the circuit. Thus, the self-synchronous transfer control circuit shown in FIG. 10 is provided with a terminal R3 in place of terminal NUM shown in FIG. 1, a single-bit D type flip-flop 9w in place of D type flip-flop 9e in FIG. 1, and a counter 9x counting from 0 to 2 in place of counter 9f counting up to N shown in FIG. 1. This results in reduction of the scale of the circuit as a self-synchronous transfer circuit compared to the one in FIG. 1. The self-synchronous transfer control circuit shown in FIG. 10 operates almost in the same manner as the circuit shown in FIG. 1.

As shown in FIGS. 11D and 11E, when "H" level signals are input both from terminal CPY and terminal R3, three packet copies are enabled, outputting the first packet when FEB="L" level and LST="L" level, outputting the second packet when FEB="H" level and LST="L" level, and outputting the third packet when FEB="H" level and LST="H" level, as indicated in FIGS. 11H and 11F.

The data transmission mechanism shown in FIG. 9 is included in operation unit FP of the data driven processor shown in FIG. 17. The packet to be input to operation unit FP of the data driven processor stores a pair of data (two sets of 12-bit data). When this packet is input to pipeline register 41a, one of the two sets of data is used for address detection of a table memory 41m by address detection circuit 41g, and the other is used for the data for multiplication.

The instruction code of the input packet is decoded and a CPY signal and a R3 signal are sent to self-synchronous transfer control circuit 31c by copy detection circuit 41h, while the content of table memory 41m is stored in the packet and held by pipeline register 41c. If both the CPY signal and the R3 signal are at "H" level, self-synchronous transfer control circuit 31c outputs a CP pulse signal to pipeline register 41c and exchanges a SEND signal and an ACK signal with C element 31d three times, resulting in output of three packets to pipeline register 41d.

Using the FEB signal and the LST signal output from self-synchronous transfer control circuit 31c, the node numbers of the packets are manipulated by node number manipulation circuit 41j to distinguish the packets from each other, while the output of multiplexer 41i, to which higher-bit data, middle-bit data and lower-bit data of the data read from table memory 41m are input, is switched.

This means that the first packet transmitted from pipeline register 41c to pipeline register 41d stores the higher bits of the memory data without manipulation of its node number, the second packet is manipulated for its node number (e.g. the node number+1) and stores the middle bits of the memory data, and the third packet is manipulated for its node number (e.g. the node number+2) and stores the lower bits of the memory data. The respective memory data stored in the three packets output from pipeline register 41d are multiplied with the data stored in the packets for multiplication by multiplier 41k, and are stored in pipeline register 41e. If the multiplied result causes an overflow, adjustment is made by shifter 41l.

As described above, according to the present embodiment, the input of one packet allows the operation to be executed for three sets of data, resulting in reduction of the number of the executive instructions. Assuming that 24-bit data is read from table memory 41m, the operation can be carried out for three sets of 8-bit data. This can be applied in image data processing such as RGB (24 bits) to increase the speed of the image processing.

As has been described above, according to the embodiments of the present invention, one data transfer request pulse signal can be received from a transfer control circuit in a preceding stage to output a plurality of data request pulse signals to a transfer control circuit in a subsequent stage, enabling several times more efficient data transfer control compared to that of the conventional art.

Further, the number of the data request pulse signals for the subsequent stage in the self-synchronous transfer control circuit may be included in a packet to be input to enable the packet copying as desired.

Moreover, it is possible to make a plurality of copies of packets having identical data from one input packet without repeated execution of the NOP instruction, so that the number of the executive instructions can be reduced, and thus the program performance is enhanced several-fold.

Furthermore, a plurality of sets of data can actually be operated by executing one instruction, so that the number of the executive instructions can be reduced, and thus the program performance is enhanced several-fold.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-synchronous transfer control circuit, comprising:
   a transfer control circuit transferring a first pulse applied from a preceding stage to a subsequent stage as a second pulse based on an instruction signal instructing enabling or disabling a transfer;
   a pulse control circuit receiving one data transfer request pulse signal as said first pulse from said transfer control circuit in the preceding stage to output a plurality of data transfer request pulse signals as said second pulse to the transfer control circuit in the subsequent stage, and
   a data number setting means setting the number of data transferred to said transfer control circuit in the subsequent stage,
   wherein the transfer control circuit, the transfer control circuit in the preceding stage, and the transfer control circuit in the subsequent stage are substantially, similarly configured, and wherein the transfer control circuit transferring a first pulse applied from a preceding stage to a subsequent stage as a second pulse is self-synchronous.

2. The self-synchronous transfer control circuit according to claim 1, wherein said pulse control circuit includes
   a first logic circuit outputting a transfer enabling pulse signal to said transfer control circuit in the preceding stage as a third pulse, in response to application of said data transfer request pulse signal from said transfer control circuit in the preceding stage,
   a second logic circuit outputting data transfer request pulse signal to said transfer control circuit in the subsequent stage,
   a storage circuit storing the number of data in response to setting of the number of data by said data number setting means,
   a gate circuit receiving a transfer enabling signal as a fourth pulse from said transfer control circuit in the subsequent stage and,
   a transfer circuit outputting said transfer request pulse signal from said second logic circuit by the number of data stored in said storage circuit every time said gate circuit receives said transfer enabling signal, in response to application of said data transfer request pulse signal to said first logic circuit, when said number of data is stored in said storage circuit.

3. The self-synchronous transfer control circuit according to clam 2, wherein said pulse control circuit includes
   a counter circuit counting the number of times said transfer request pulse signal is output, and
   a disabling circuit comparing the counter output of said counter circuit with the number of data stored in said storage circuit to disable the output of said transfer request pulse signal by said transfer circuit, in response to correspondence thereof.

4. The data driven information processing device of claim 1, wherein the output of the plurality of data transfer request pulse signals is a copying process.

5. A data driven information processing device, using a self-synchronous transfer control circuit receiving one data transfer request pulse signal indicating request of transfer from a transfer control circuit in a preceding stage to output a plurality of transfer request pulse signals to a transfer control circuit in a subsequent stage, comprising:
   a data transmission path holding a data packet based on a pulse signal applied from said self-synchronous transfer control circuit; and
   a data number detection means for detecting the number of data based on output packet information set to the data packet held in said data transmission path, said self-synchronous transfer control circuit outputting a transfer request pulse signal corresponding to the number of data, in response to detection of the number of data by said data number detection means, wherein said data number detection means transmits a plurality of data packets different from data packet from the data transmission path to a data transmission path in a subseciuent stage, in response to detection of said copying instruction.

6. The data driven information processing device according to claim 5, wherein said data transmission path holds a data packet including a destination field storing at least destination information, an instruction field storing instruction information and a data field storing data; and
   said data number detection means transmits, in response to detection that a copying instruction is present in an instruction field included in the data packet held in said data transmission path, data copied from the data transmission path in a subsequent stage.

7. The data driven information processing device according to claim 6, wherein a data number detection means transmits a plurality of data packets having the same data as the data in a data field included in the data packet and having destination information different from each other, from the data transmission path to the data transmission path in a subsequent stage, in response to detection of said copying instruction.

8. The data driven information processing device of claim 5, wherein the pulse signal is not a clock signal.

* * * * *